(12) United States Patent
Neumeier et al.

(10) Patent No.: US 9,055,309 B2
(45) Date of Patent: Jun. 9, 2015

(54) SYSTEMS AND METHODS FOR IDENTIFYING VIDEO SEGMENTS FOR DISPLAYING CONTEXTUALLY RELEVANT CONTENT

(71) Applicants: Zeev Neumeier, Berkeley, CA (US);
Brian Reed, Stamford, CT (US);
Michael Collette, San Rafael, CA (US);
W. Leo Hoarty, Morgan Hill, CA (US)

(72) Inventors: Zeev Neumeier, Berkeley, CA (US);
Brian Reed, Stamford, CT (US);
Michael Collette, San Rafael, CA (US);
W. Leo Hoarty, Morgan Hill, CA (US)

(73) Assignee: Cognitive Networks, Inc., San Francisco, CA (US)

( * ) Notice: Subject to any disclaimer, the term of this patent is extended or adjusted under 35 U.S.C. 154(b) by 0 days.

(21) Appl. No.: 14/217,075

(22) Filed: Mar. 17, 2014

(65) Prior Publication Data
US 2014/0201769 A1  Jul. 17, 2014

Related U.S. Application Data

(63) Continuation-in-part of application No. 14/089,003, filed on Nov. 25, 2013, and a continuation-in-part of
(Continued)

(51) Int. Cl.
| | |
|---|---|
| *H04N 7/16* | (2011.01) |
| *H04N 21/236* | (2011.01) |
| *H04N 21/235* | (2011.01) |
| *H04N 21/24* | (2011.01) |
| *H04N 21/435* | (2011.01) |

(Continued)

(52) U.S. Cl.
CPC .... *H04N 21/23614* (2013.01); *H04N 21/44222* (2013.01); *H04N 21/4424* (2013.01); *H04N 21/235* (2013.01); *H04N 21/2401* (2013.01); *H04N 21/435* (2013.01); *H04N 21/8126* (2013.01); *H04N 21/8133* (2013.01); *H04N 21/2353* (2013.01); *H04N 21/236* (2013.01); *H04N 21/6581* (2013.01); *H04N 21/6582* (2013.01); *H04N 5/44591* (2013.01); *H04N 21/44008* (2013.01); *H04N 21/44204* (2013.01); *H04N 21/4532* (2013.01); *H04N 21/462* (2013.01); *H04N 21/4667* (2013.01); *H04N 21/478* (2013.01); *H04N 5/765* (2013.01); *H04N 21/812* (2013.01); *H04N 9/8205* (2013.01)

(58) Field of Classification Search
CPC ............ H04N 21/235; H04N 21/2401; H04N 21/435; H04N 21/8133
USPC ........................................................ 725/14, 40
See application file for complete search history.

(56) References Cited

U.S. PATENT DOCUMENTS

| 6,415,438 B1 * | 7/2002 | Blackketter et al. .......... 725/136 |
| 7,028,327 B1 * | 4/2006 | Dougherty et al. ............. 725/93 |

(Continued)

*Primary Examiner* — Hai V Tran
*Assistant Examiner* — Carmine Malangone
(74) *Attorney, Agent, or Firm* — Puget Patent; Michael Gibbons

(57) ABSTRACT

A system and method for the identification of specific video segments in a video program, such as certain TV commercials, is presented. A means is described for an accelerated identification of the video segment of interest in conjunction with a means to communicate said information to a process in a remote television system such that the remote television system can anticipate the future start of said video segment of interest and display contextually related material in close proximity to the start of said video segment.

91 Claims, 14 Drawing Sheets

Related U.S. Application Data application No. 12/788,721, filed on May 27, 2010, now Pat. No. 8,595,781, and a continuation-in-part of application No. 12/788,748, filed on May 27, 2010, now Pat. No. 8,769,584, and a continuation-in-part of application No. 14/217,039, filed on Mar. 17, 2014, and a continuation-in-part of application No. 14/217,094, filed on Mar. 17, 2014, and a continuation-in-part of application No. 14/217,375, filed on Mar. 17, 2014, and a continuation-in-part of application No. 14/217,425, filed on Mar. 17, 2014, and a continuation-in-part of application No. 14/217,435, filed on Mar. 17, 2014.

(60) Provisional application No. 61/791,578, filed on Mar. 15, 2013, provisional application No. 61/290,714, filed on Dec. 29, 2009, provisional application No. 61/182,334, filed on May 29, 2009.

(51) Int. Cl.
*H04N 21/81* (2011.01)
*H04N 21/658* (2011.01)
*H04N 5/445* (2011.01)
*H04N 21/44* (2011.01)
*H04N 21/45* (2011.01)
*H04N 21/462* (2011.01)
*H04N 5/765* (2006.01)
*H04N 9/82* (2006.01)
*H04N 21/442* (2011.01)
*H04N 21/466* (2011.01)
*H04N 21/478* (2011.01)

(56) References Cited

U.S. PATENT DOCUMENTS

| | | | |
|---|---|---|---|
| 8,776,105 B2 | 7/2014 | Sinha et al. | |
| 8,832,723 B2 | 9/2014 | Sinha et al. | |
| 8,856,817 B2 | 10/2014 | Sinha et al. | |
| 8,893,167 B2 | 11/2014 | Sinha et al. | |
| 8,893,168 B2 | 11/2014 | Sinha et al. | |
| 8,918,804 B2 | 12/2014 | Sinha et al. | |
| 8,918,832 B2 | 12/2014 | Sinha et al. | |
| 2004/0240562 A1* | 12/2004 | Bargeron et al. | 375/240.29 |
| 2006/0031914 A1* | 2/2006 | Dakss et al. | 725/135 |
| 2007/0061831 A1* | 3/2007 | Savoor et al. | 725/13 |
| 2007/0113263 A1* | 5/2007 | Chatani | 725/135 |
| 2007/0180459 A1* | 8/2007 | Smithpeters et al. | 725/19 |
| 2008/0172690 A1 | 7/2008 | Kanojia | |
| 2009/0172746 A1 | 7/2009 | Aldrey | |
| 2010/0235486 A1* | 9/2010 | White et al. | 709/223 |
| 2010/0269138 A1* | 10/2010 | Krikorian et al. | 725/39 |
| 2012/0017240 A1 | 1/2012 | Shkedi | |
| 2012/0158511 A1 | 6/2012 | Lucero | |
| 2013/0139209 A1* | 5/2013 | Urrabazo et al. | 725/109 |

\* cited by examiner

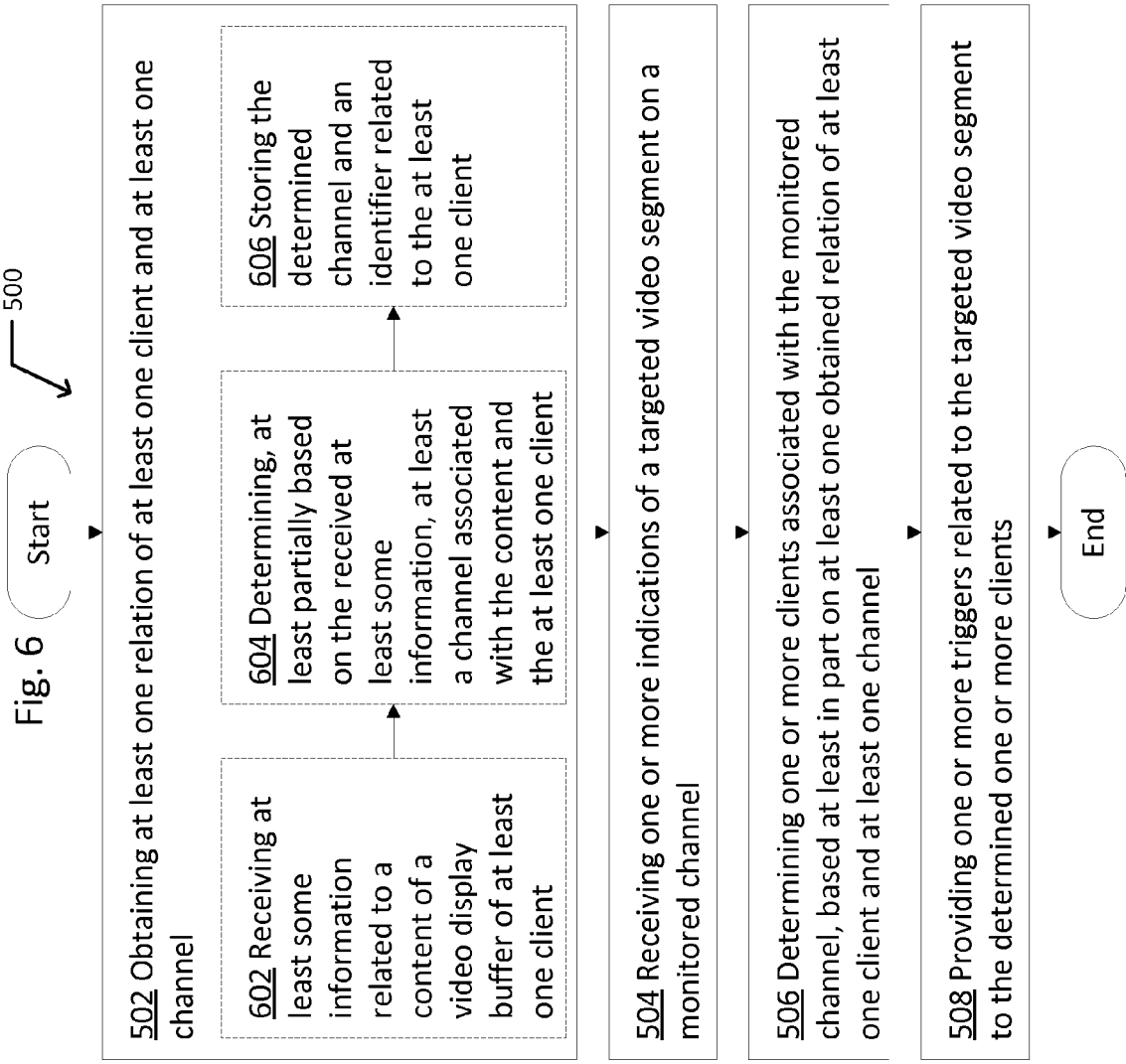

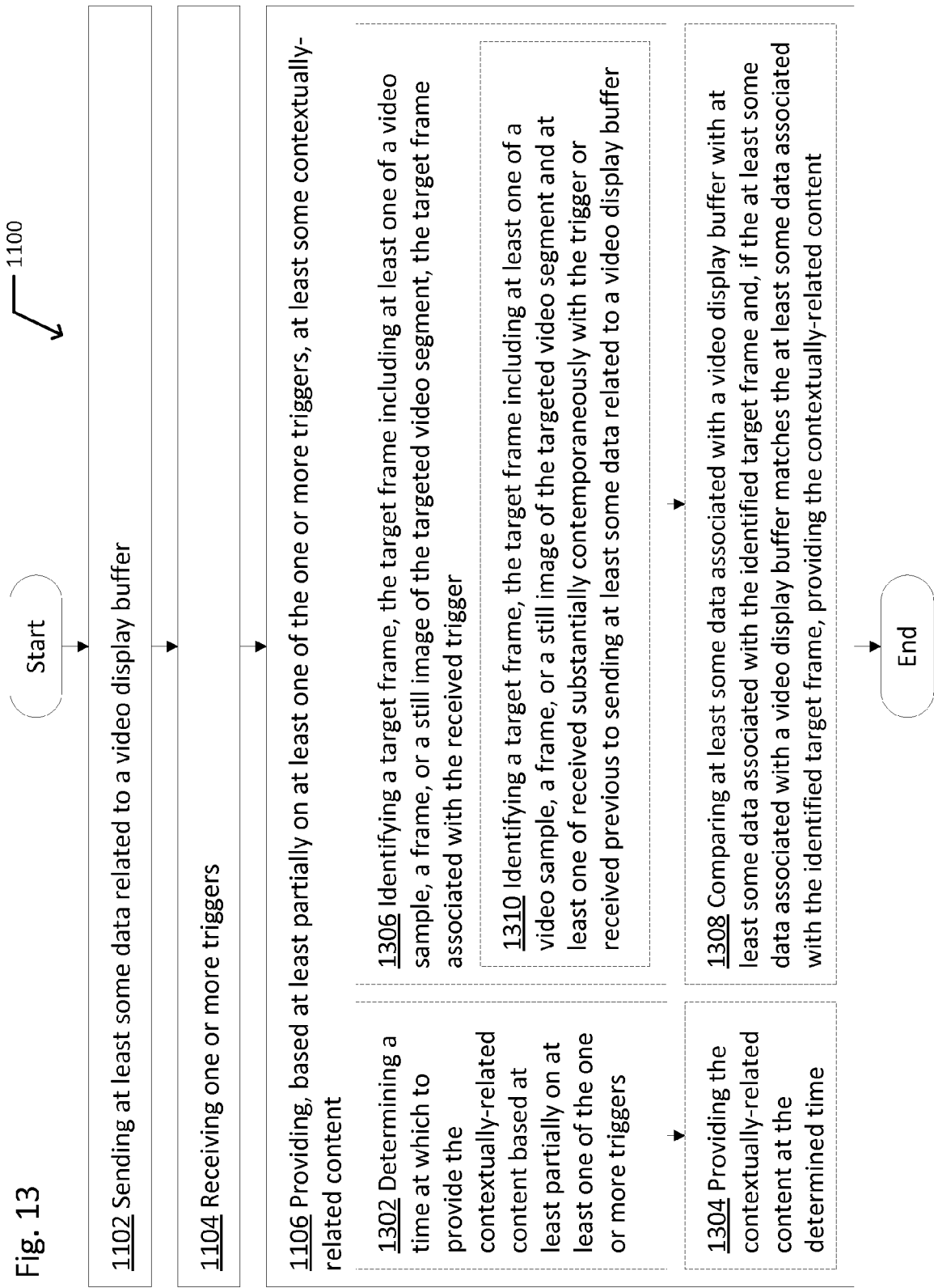

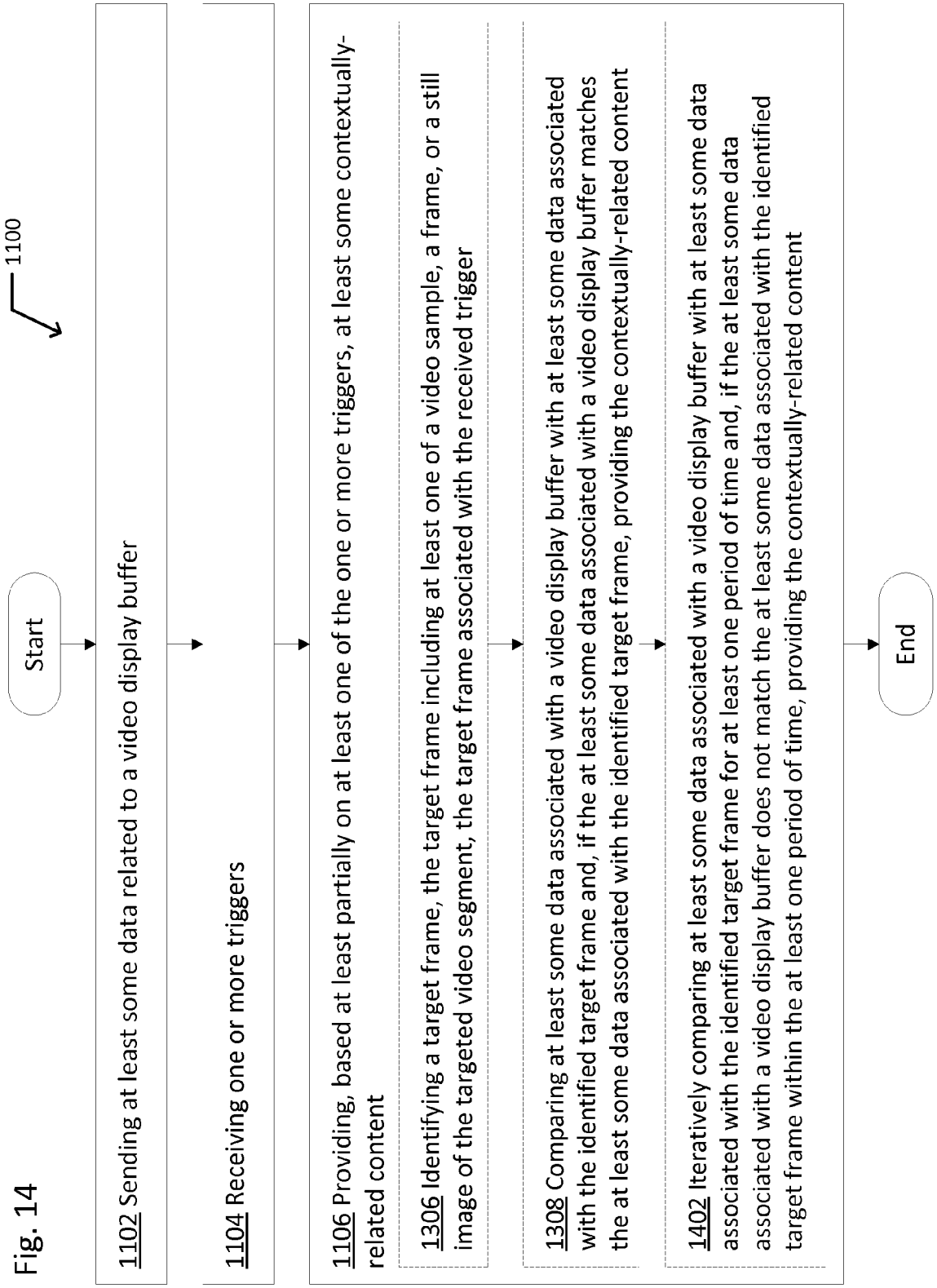

SYSTEMS AND METHODS FOR IDENTIFYING VIDEO SEGMENTS FOR DISPLAYING CONTEXTUALLY RELEVANT CONTENT

PRIORITY CLAIM

This application constitutes a continuation-in-part of U.S. patent application Ser. No. 12/788,721, entitled "METHODS FOR IDENTIFYING VIDEO SEGMENTS AND DISPLAYING CONTEXTUAL TARGETED CONTENT ON A CONNECTED TELEVISION," filed May 27, 2010, and issued Nov. 6, 2013 as U.S. Pat. No. 8,595,781, that application being a non-provisional application claiming priority from U.S. Provisional Patent Application No. 61/182,334, entitled "SYSTEM FOR PROCESSING CONTENT INFORMATION IN A TELEVIDEO SIGNAL," filed May 29, 2009 and being a non-provisional application claiming priority from U.S. Provisional Patent Application No. 61/290,714, entitled "CONTEXTUAL TARGETING BASED ON DATA RECEIVED FROM A TELEVISION SYSTEM," filed Dec. 29, 2009; this application further constitutes a continuation-in-part of U.S. patent application Ser. No. 12/788,748, entitled "METHODS FOR DISPLAYING CONTEXTUALLY TARGETED CONTENT ON A CONNECTED TELEVISION," filed May 27, 2010; this application further constitutes a continuation-in-part of U.S. patent application Ser. No. 14/089,003, entitled "METHODS FOR IDENTIFYING VIDEO SEGMENTS AND DISPLAYING CONTEXTUALLY TARGETED CONTENT ON A CONNECTED TELEVISION," filed Nov. 25, 2013; this application further constitutes a continuation-in-part of U.S. patent application Ser. No. 14,217,039, entitled "SYSTEMS AND METHODS FOR ADDRESSING A MEDIA DATABASE USING DISTANCE ASSOCIATIVE HASHING," filed Mar. 17, 2014; this application further constitutes a continuation-in-part of U.S. patent application Ser. No. 14/217,094, entitled "SYSTEMS AND METHODS FOR REAL-TIME TELEVISION AD DETECTION USING AN AUTOMATED CONTENT RECOGNITION DATABASE," filed Mar. 17, 2014; this application further constitutes a continuation-in-part of U.S. patent application Ser. No. 14/217,375, entitled "SYSTEMS AND METHODS FOR ON-SCREEN GRAPHICS DETECTION," filed Mar. 17, 2014; this application further constitutes a continuation-in-part of U.S. patent application Ser. No. 14/217,425, entitled "SYSTEMS AND METHODS FOR IMPROVING SERVER AND CLIENT PERFORMANCE IN FINGERPRINT ACR SYSTEMS," filed Mar. 17, 2014; this application further constitutes a continuation-in-part of U.S. patent application Ser. No. 14/217,435, entitled "SYSTEMS AND METHODS FOR MULTI-BROADCAST DIFFERENTIATION," filed Mar. 17, 2014; and this application further constitutes a non-provisional application of U.S. Provisional Patent Application No. 61/791,578, entitled "SYSTEMS AND METHODS FOR IDENTIFYING VIDEO SEGMENTS BEING DISPLAYED ON REMOTELY LOCATED TELEVISIONS," filed Mar. 15, 2013. The foregoing applications are either currently co-pending or are applications of which a currently co-pending application is entitled to the benefit of the filing date.

FIELD OF THE INVENTION

This invention generally relates to image recognition, and more particularly, to systems and methods for identifying video segments for displaying contextually relevant content.

BACKGROUND

Since the initial experiments with interactive television in the early 1990's, numerous approaches have been proposed to provide additional, contextually-relevant information to TV viewers regarding what is then being displayed on their screen. One example of this application could be special offers associated with a certain nationally broadcast commercial that enhance the national message with localized pricing or availability information. Practical considerations regarding synchronizing the arriving broadcast advertisement and the local creation and display of the message to be overlaid on a specific TV set have resulted in the contextually-relevant information being displaying at an unacceptable offset from the actual start of the associated video segment.

Using prior art, the detection and identification of a specific video segment can take approximately 7 to 10 seconds using means known to those skilled in that art. Examples of such known means include identification of various video or audio "fingerprints" or detection of a unique "watermark" code previously embedded in the video segment of interest. However, by the time such a detection system can respond and the additional related information be retrieved, prepared, and displayed on the television, the video segment of interest (for example, a thirty second commercial message) will have been running for about fifteen seconds or even longer with the result being that the overlaid message loses its contextual relevance.

It is the object of this invention to eliminate essentially all of this delay by using a system and method that anticipates the arrival of a specific advertisement of interest so that the various required processes to confirm the arrival of the segment and locally generate and display the relevant graphics may be initiated slightly in advance of the actual arrival of the video segment of interest.

SUMMARY

In some embodiments, an exemplary method related to identifying video segments for displaying contextually relevant content may include obtaining at least one relation of at least one client and at least one channel; receiving one or more indications of a targeted video segment on a monitored channel; determining one or more clients associated with the monitored channel, based at least in part on at least one obtained relation of at least one client and at least one channel; and providing one or more triggers related to the targeted video segment to the determined one or more clients.

In some embodiments, obtaining at least one relation of at least one client and at least one channel may include receiving at least some information related to a content of a video display buffer of at least one client; determining, at least partially based on the received at least some information, at least a channel associated with the content and the at least one client; and storing the determined channel and an identifier related to the at least one client.

In some embodiments, obtaining at least one relation of at least one client and at least one channel may include obtaining at least one relation including at least one latency associated with at least one client and at least one channel. In some embodiments, obtaining at least one relation including at least one latency associated with at least one client and at least one channel may include receiving at least some information related to a content of a video display buffer of at least one client; determining, at least partially based on the received at least some information, at least (i) a channel associated with the content and the at least one client, and (ii) a latency associated with a network feed and the channel associated with the content; and storing the determined channel, the determined latency, and an identifier related to the at least one client.

In some embodiments, receiving one or more indications of a targeted video segment on a monitored channel may include receiving one or more indications of a targeted video segment on a monitored channel, wherein an audiovisual stream associated with the monitored channel is received at least some quantum of time in advance of the audiovisual stream being received by a client receiving the channel. In some embodiments, receiving one or more indications of a targeted video segment on a monitored channel may include receiving one or more of at least one frame, at least one sample of a data stream, or at least one still image broadcast via at least one channel; determining one or more hash values associated with the received one or more of at least one frame, at least one sample of a data stream, or at least one still image; receiving at least one of one or more candidates or one or more suspects from a data store based at least partially on the determined one or more hash values, the data store including at least some hash values associated with one or more targeted video segments; and probabilistically determining a targeted video segment based on the received at least one of one or more candidates or one or more suspects.

In some embodiments, determining one or more clients associated with the monitored channel, based at least in part on at least one obtained relation of at least one client and at least one channel may include retrieving one or more client identifiers associated with matching one or more stored relations between one or more determined channels and one or more clients with one or more identifiers related to the monitored channel. In some embodiments, determining one or more clients associated with the monitored channel, based at least in part on at least one obtained relation of at least one client and at least one channel may include determining one or more clients associated with the monitored channel, the one or more clients tuned to the same channel as the monitored channel, wherein an audiovisual stream associated with the monitored channel is received previous to the audiovisual stream being received by a client receiving a channel corresponding to the monitored channel.

In some embodiments, providing one or more triggers related to the targeted video segment to the determined one or more client systems may include providing one or more triggers related to the targeted video segment to the determined one or more clients, the one or more triggers including at least one time offset related to one or more obtained latencies. In some embodiments, providing one or more triggers related to the targeted video segment to the determined one or more client systems may include providing one or more triggers related to the targeted video segment to the determined one or more client systems, the one or more triggers including at least some data related to at least one of a video sample, a frame, or a still image of the targeted video segment. In some embodiments, providing one or more triggers related to the targeted video segment to the determined one or more client systems may include providing one or more triggers related to the targeted video segment to the determined one or more client systems, the one or more triggers including at least one time offset related to one or more obtained latencies and including at least some data related to at least one of a video sample, a frame, or a still image of the targeted video segment.

In some embodiments, another exemplary method related to identifying video segments for displaying contextually relevant content may include sending at least some data related to a video display buffer; receiving one or more triggers; and providing, based at least partially on at least one of the one or more triggers, at least some contextually-related content. In some embodiments, sending at least some data related to a video display buffer and receiving one or more triggers may include sending at least some data related to a video display buffer of a client tuned to a particular channel and receiving one or more triggers associated with a network feed of a channel corresponding to the channel to which the client is tuned, wherein the one or more triggers relate to a target video segment detected via an ingest module receiving the network feed, the one or more triggers received by the client subsequent to detection of the target video segment at the ingest module and prior to reception of the target video segment at the client.

In some embodiments, providing, based at least partially on at least one of the one or more triggers, at least some contextually-related content may include providing at least some contextually-related content received previous to sending at least some data related to a video display buffer. In some embodiments, providing, based at least partially on at least one of the one or more triggers, at least some contextually-related content may include determining a time at which to provide the contextually-related content based at least partially on at least one of the one or more triggers; and providing the contextually-related content at the determined time. In some embodiments, providing, based at least partially on at least one of the one or more triggers, at least some contextually-related content may include identifying a target frame, the target frame including at least one of a video sample, a frame, or a still image of the targeted video segment, the target frame associated with the received trigger; and comparing at least some data associated with a video display buffer with at least some data associated with the identified target frame and, if the at least some data associated with a video display buffer matches the at least some data associated with the identified target frame, providing the contextually-related content.

In some embodiments, identifying a target frame, the target frame including at least one of a video sample, a frame, or a still image of the targeted video segment, the target frame associated with the received trigger may include identifying a target frame, the target frame including at least one of a video sample, a frame, or a still image of the targeted video segment and at least one of received substantially contemporaneously with the trigger or received previous to sending at least some data related to a video display buffer. In some embodiments, the method may further include iteratively comparing at least some data associated with a video display buffer with at least some data associated with the identified target frame for at least one period of time and, if the at least some data associated with a video display buffer does not match the at least some data associated with the identified target frame within the at least one period of time, providing the contextually-related content.

In some embodiments, an exemplary system related to identifying video segments for displaying contextually relevant content may include one or more clients associated with one or more video display buffers configured for at least sending at least some data related to the one or more video display buffers and receiving one or more triggers associated with contextually-related content; and a central media center, the central media center including at least: a media data store configured for at least maintaining at least some data capable of identifying video segments; an ingest module in communication with the media data store, the ingest module configured for at least receiving broadcasts and signaling the media data store to maintain at least some identifying data related to at least some received broadcasts; a context data store, the context data store configured for at least maintaining at least some data related to one or more targeted video segments; a video segment detection module in communication with the context data store and the ingest module, the video segment detection module configured for detecting one or more targeted video segments within one or more received broadcasts; a client tracking module in communication with the media data store and the one or more clients, the client tracking module configured for at least receiving at least some data associated with one or more video display buffers from the one or more clients and determining, based at least in part on the received at least some data and the media data store, one or more program sources associated with the one or more clients; and a client triggering module in communication with the client tracking module and the video segment detector, the client triggering module configured for at least sending one or more triggers associated with contextually-related content to at least one of the one or more clients based at least partially on one or more indications received from the video segment detection module related to one or more targeted video segments and based at least partially on one or more indications received from the client tracking module related to one or more determined program sources associated with one or more clients.

In some embodiments of the exemplary system, the one or more clients and the central media center may include one or more clients tuned to a particular channel and a central media center including at least an ingest module receiving a network feed of the particular channel to which the one or more clients are tuned, wherein the ingest module receives an audiovisual stream of the network feed previous to the corresponding audiovisual stream being received by the one or more clients tuned to the particular channel corresponding to the network feed, the difference in time being a latency period, wherein a duration associated with sending one or more triggers from a client triggering module of the central media center and receiving the one or more triggers by the one or more clients is less than the latency period.

In some embodiments of the invention, trigger sets as well as search configurations are customized to specific items of content (i.e. specific television shows, commercials, or movies). For example basketball games are identified as such and the contextual targeting module uses a trigger set comprising names of players/coaches etc. In another example, news and current events shows are configured to use a trigger set that emphasizes politicians' names and current event buzzwords (i.e. "healthcare"). In another example, drama shows and sitcoms are configured to use a trigger set that is composed of arbitrary combinations of words and timestamps meant to trigger events on a given location in the plot without relevance to the subject of the dialog (e.g., an event corresponding to a song which starts playing after a specific point in the plot and/or provision of context-sensitive content at a particular time offset relative to the beginning of the video segment being displayed by the television). Accordingly, a trigger set may be customized, by the television or at a server, which associates interactive events or context-sensitive content with offset times related to displayed video content.

In some embodiments of the invention, the systems and methods herein may provide contextually targeted content to the television system. The contextual targeting is based on not only identification of the video segment being played, but also a determination concerning the playing time or offset time of the particular portion of the video segment being currently displayed. The terms "playing time" and "offset time" are used interchangeably herein and refer to a time which is offset from a fixed point in time, such as the starting time of a particular television program or commercial.

In some embodiments of the invention, a content widget identifies in real time which video segment is being displayed and optionally determines what is the time offset from the starting time of the segment. The segment and offset together are referred to herein as the "location." Means for identifying video segments being viewed on a connected TV and, optionally, determining offset times can reside on a television system of which the connected TV is a component. In accordance with alternative embodiments, means for identifying video segments resides on the television system and another part resides on a server connected to the television system via the Internet. In response to identifying the video segment being viewed and, optionally, determining the time offset, various embodiments of the invention may retrieve additional information which is targeted as being relevant to the context of the subject matter of a video segment being viewed.

In addition to the foregoing, various other methods, systems and/or program product embodiments are set forth and described in the teachings such as the text (e.g., claims, drawings and/or the detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, embodiments, features and advantages of the device and/or processes and/or other subject matter described herein will become apparent in the teachings set forth herein.

BRIEF DESCRIPTION OF THE DRAWINGS

Certain embodiments of the present invention are described in detail below with reference to the following drawings:

FIG. 5 illustrates an operational flow representing example operations related to identifying video segments for displaying contextually relevant content.

FIG. 6 illustrates an alternative embodiment of the operational flow of FIG. 5.

FIG. 13 illustrates an alternative embodiment of the operational flow of FIG. 11.

FIG. 14 illustrates an alternative embodiment of the operational flow of FIG. 11.

DETAILED DESCRIPTION

Figure 1:
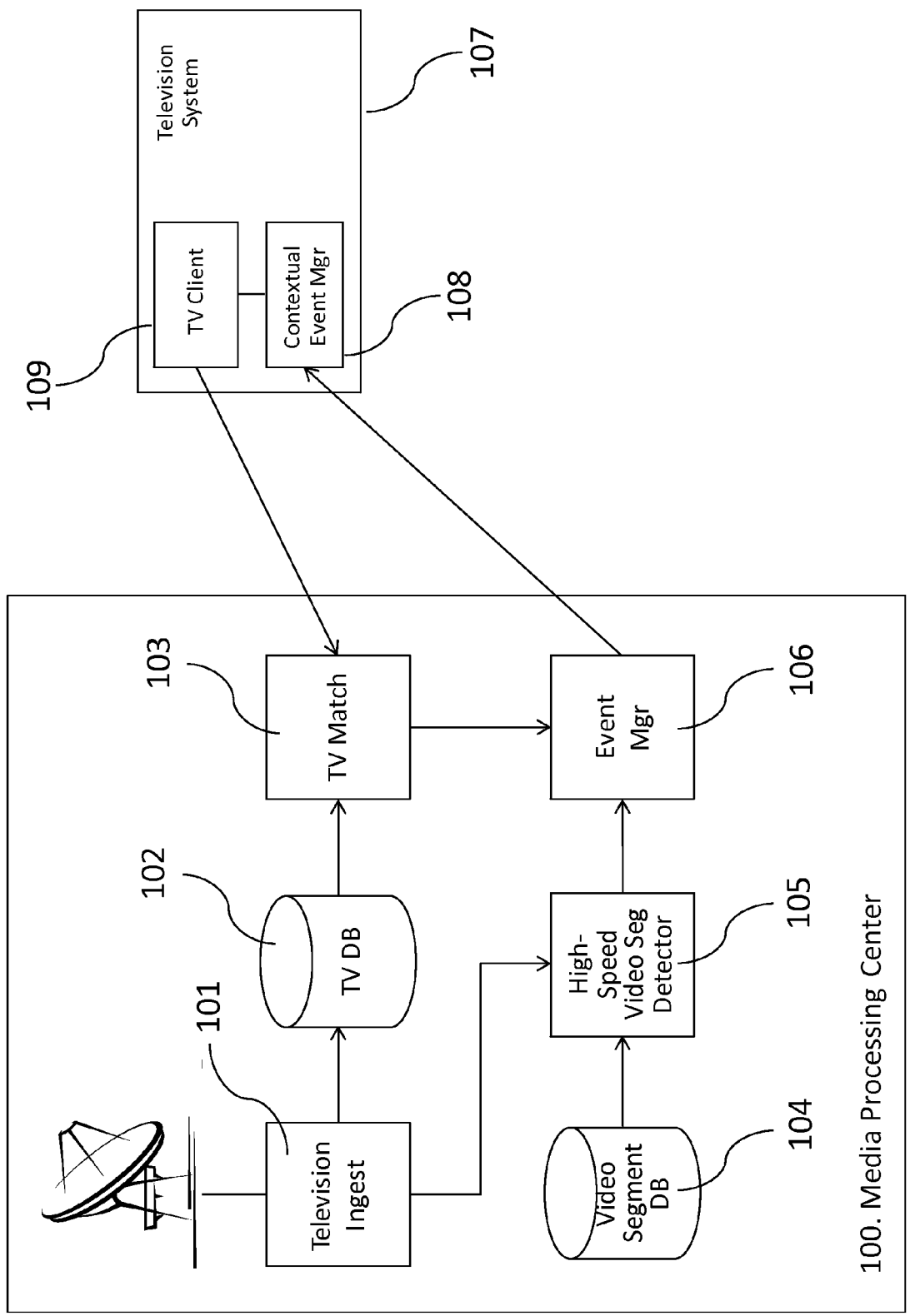
FIG. 1 is a block diagram of the system to detect specific commercials or any other video segment in a broadcast stream at a time earlier than their receipt by a home TV, and implement the creation and synchronous on-screen display of additional graphical information associated with the segment.

FIG. 1 describes a system to provide accelerated detection of a video segment of interest and to also detect a sequence of events and to cause an event trigger to be sent to a software application of the invention resident in a connected television receiver to cause said application to display contextually targeted information for at least the duration of the video segment of interest.

Due to its location in the distribution network, the central server system 101 of the invention receives television programming from a regional processing center in advance of its receipt by the television system in the home. This time difference allows the system to prepare appropriate responses in advance of the arrival and display of a particular video segment, such as a television commercial or the like, such that contextually targeted information can be displayed with an unnoticeable delay upon the appearance of said video segment on the television display in a home 107.

It is well known to the person skilled in the art that there are significant latencies inherent in the national television distribution system since the signals are generally processed through regional and local television distribution centers. The primary means of television program distribution is via fiber-optic networks which on their own impose only slight delays. However, the many means of television distribution include statistical multiplexing, rate grooming and other processing known to the skilled person. Each of these processes entail delays which accumulate and account for a total delay of about a three to five seconds from the regional center to the viewer's home. When satellite distribution is used in segments of the distribution system in place of fiber-optic cable, an addition few seconds are added to the distribution chain for the hop from earth to geostationary satellite and back, plus signal processing.

One element of the system and method of this invention as described herein is to obtain access to the program video stream as far upstream from the home as possible. This method enables the system described herein to simulate an apparent ability to, in effect, "look ahead in time" and to identify video segments significantly before their actual receipt by the TV set in the viewer's home that is located at the end of a long distribution chain.

Typically, the television programming will be received at the media processing center means 100 approximately 3 to 5 seconds in advance of the same programming passing through the rest of the distribution network on its way to the viewer's home. For consumers of satellite television, an additional few seconds are added due the trip up and back to a geosynchronous satellite (in addition to any satellite links earlier in the distribution system). System 101 processes said television signals thereby creating a database of fingerprints 102 to be used as a reference database for the purpose of matching unknown video or audio programming 103 from a television monitor 107 in a remote location such as a private home of a user of said system.

Low Latency Video Segment Detector 105 utilizes a database for television video segments 104 which are to trigger contextually related content display on said remote television means. Said database is of a reduced size relative to the primary television programming database of the invention 102. This enables accelerated detection of video segments stored in the video segment database 104 when said video segment is present on a monitored television channel displayed by the low-latency television receiver system 101. The output of video segment match 105 is a data trigger to the event manager 106 to inform 106 of the presence of a particular video segment of interest. Event manager 106 is also supplied with TV match information indicating currently playing television programming. Event manager 106 is further supplied with the detected results of the currently display channel from the home television system 107. The output of 106 is an event trigger data message to connected TV 107 which will cause 107 to retrieve, format and be ready to display the appropriately contextually targeted information. Additionally, a clock time to display said information is also supplied as part of the data message. The television system 107 then displays said information at the time specified instruction received from the event manager 106.

This invention specifies a system to ingest and process television content in advance of its distribution and arrival to the home by the means of the current invention and also specifies a second television video segment matching system providing low-latency detection that monitors one or more television channels located at a processing center 100 of the invention.

The television video segment detection system 105 is programmed to detect the presence of a number of specific television ads and is optimized for high-speed and low-delay (latency) detection. The invention includes an event manager 106 which processes event scripts for the purpose of detecting a sequence of events and then issuing an event trigger to a remote software application of the invention 108. Said scripts contain event sequences which must be satisfied prior to the triggering of a local event by the television app of the invention 108.

For example, a script may specify that the television is tuned to a specific channel as detected by TV match system 103 from media fingerprints sent by a data network from the application of the invention 109 from a connected television 107. The event manager 106 will further detect that a certain confidence interval has been reached, for example, the television 107 has been continuously tuned to a desired channel for more than five seconds and that the television program as specified by the event script is at 6 minutes and 30 seconds from the start of program and, finally, the video segment detection system 105 must have detected the presence of the video segment of interest. When all script rules are satisfied, the event manager 106 will send an event trigger to the television app of the invention 108 which will cause said app to display an overlay window containing addition information in synchronization with the arriving video segment.

Figure 4:
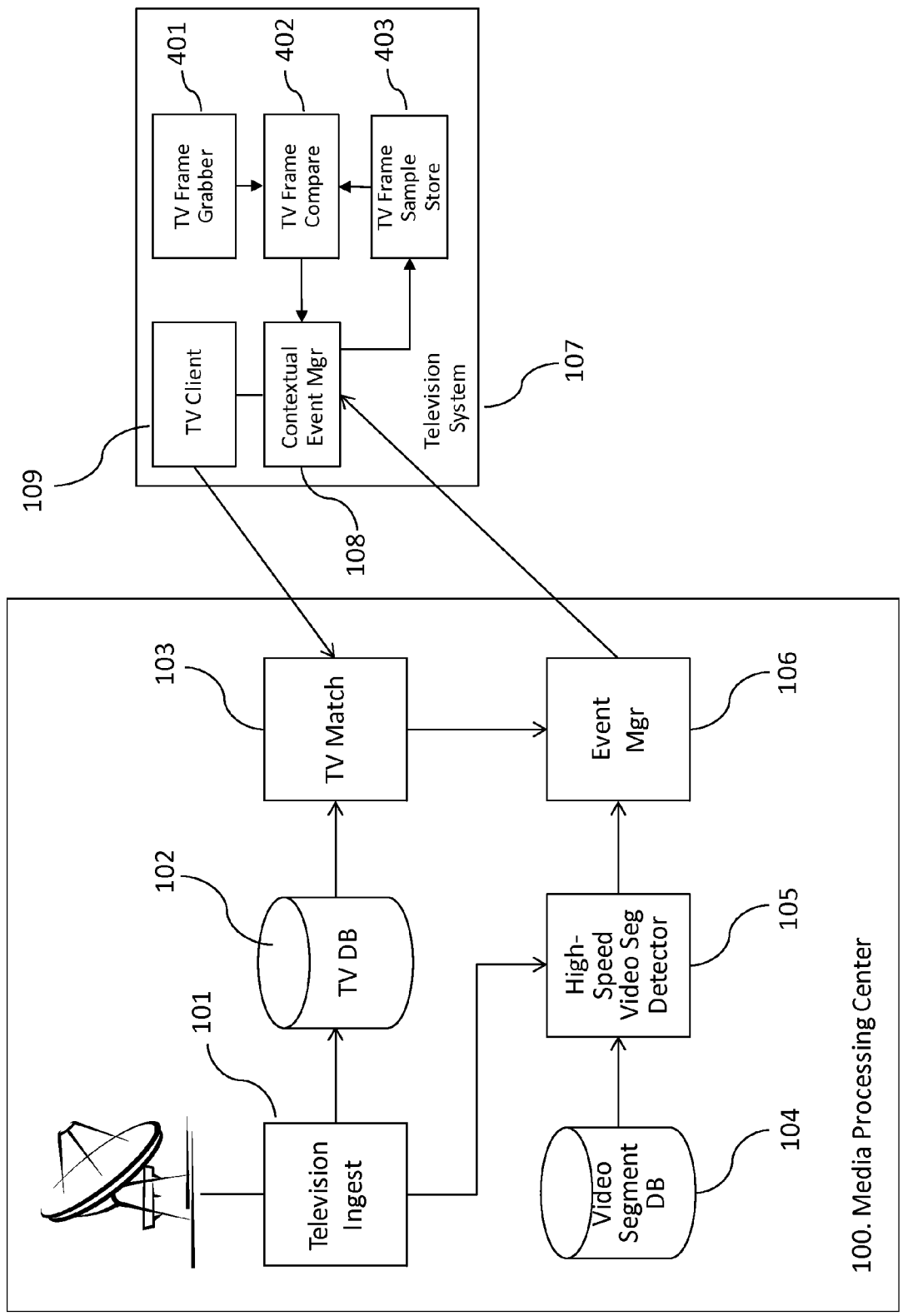
FIG. 4 is a block diagram of an exemplary media processing center and an exemplary client, in accordance with an alternate embodiment of the invention.

FIG. 4 depicts an alternative embodiment of the invention, which calls for a video matching function that is enabled by the event manager 106 of the system described above. If the television 107 is tuned to a television channel that has upcoming events prepared by the system, the television contextual event manager 108 is provided with a video frame of an upcoming video segment within a few seconds of its airing based on the time code from the elapsed time since the start of the program currently display on said television. Said video frame is recalled from the central media processing center 100 from the video segment database 104. Said reference video frame is passed to a TV frame store 403 stores said frame in memory. Next, and a process is initiated by TV frame compare 402 of examining every frame of video from television 107 video display buffer via TV frame grabber 401. TV frame compare 402 compares video frames until a match is found. Upon matching stored frame in 403 with live video from TV frame grabber 401, application 108 is triggered to display contextually targeted information in a manner similar to the means described above.

Several means of matching video segments in TV frame compare 402 can be applied including comparing relative values of pixel patch differences where an array of perhaps ten evenly distributed pixel patches is compared with the reference video frame. If the average difference among all patch comparisons is within a predetermined threshold, then a match is assumed.

Another means of matching within the television systems 107 internal processor might involve the use of the perceptual hash algorithm to compare the reference frame 403 to the unknown video frames from TV frame grabber 401. The perceptual hash algorithm is a software means well known to those skilled in the art that excels in matching single frame images. Perceptual hash algorithms describe a class of comparable hash functions. Features in the image are used to generate a distinct but not unique fingerprint, and these fingerprints are comparable.

Perceptual hashes are a different concept compared to cryptographic hash functions like MD5 and SHA1. With cryptographic hashes, the hash values are random and cannot be compared. In contrast, perceptual hashes can be compared providing some measure of similarity between the two data sets of hash values.

Every perceptual hash algorithm has the same basic properties: images can be scaled larger or smaller, have different aspect ratios, and even minor coloring differences including changes in contrast and brightness and they will still match similar images. As perceptual hashing algorithms are in the public domain and well known to those skilled in the art, the algorithm will not be describe here.

In any case of employing video sequence matching performed by the processor of the connected television system, the system of the invention gains the advantage of displaying the contextually targeted information within the first few frames of a video segment of interest thus keeping the latency of the display of the contextually relevant material to an acceptably brief level.

As a precaution, if the single frame matching by the application of the invention of television 107 fails to find a match for whatever reason, the process can be backed up by the first method of using the Event Manager 106 to send an event trigger via the network to the connected television and hence trigger the event (contextually targeted display or other events) as described above, the only penalty to the process is the delay of 2 or 3 seconds.

Figure 2:
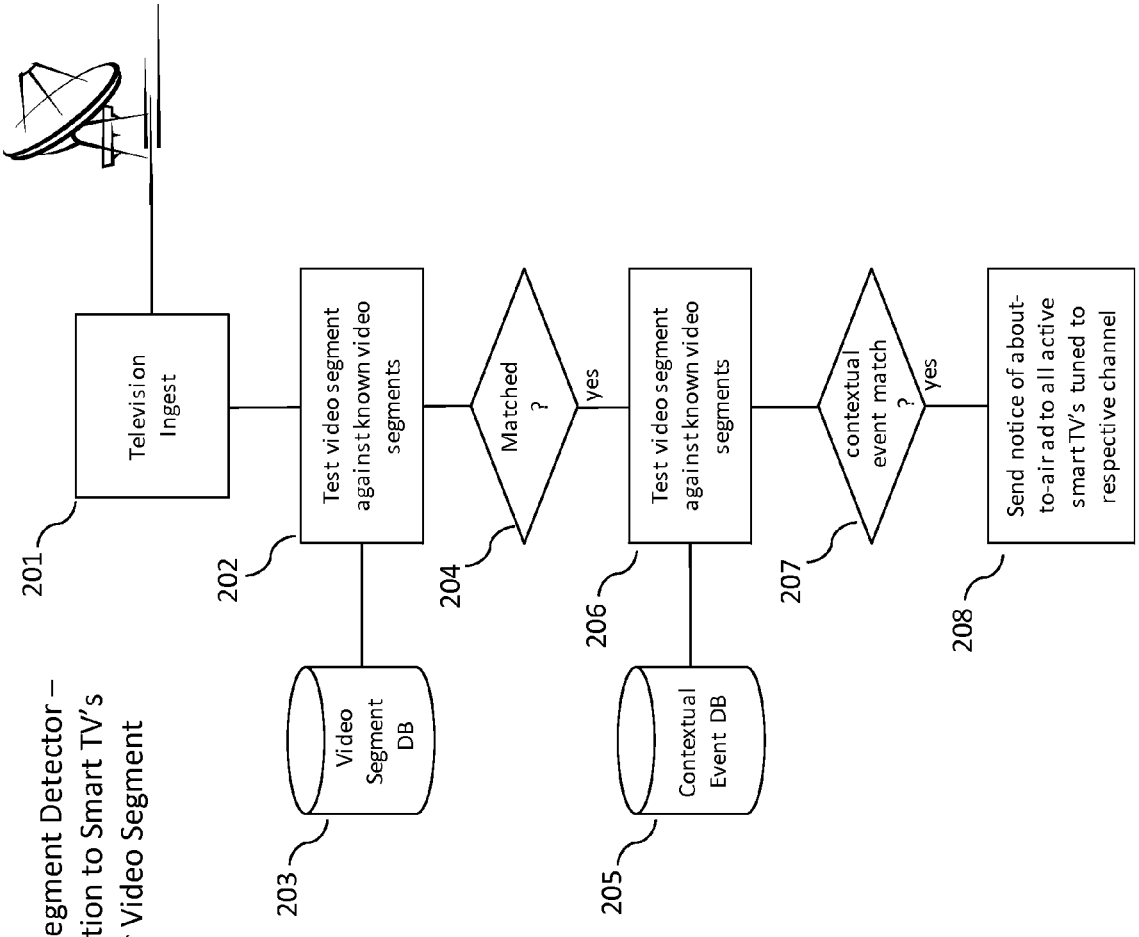
FIG. 2 is a flow diagram of the discreet discrete steps of the method implemented by the system.
Figure 3:
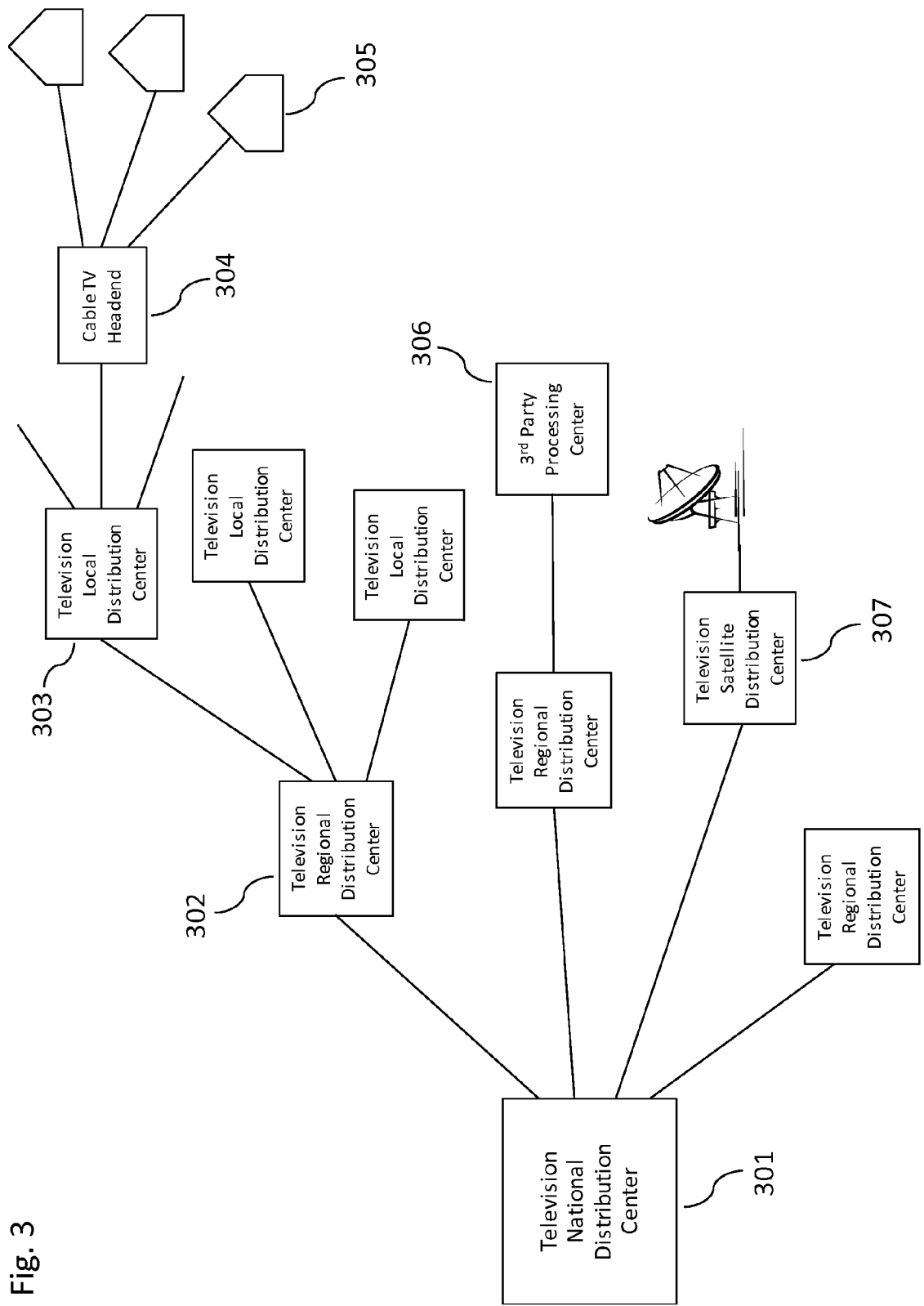
FIG. 3 is a high-level diagram of national television distribution through regional and local distribution points then to the headend of a cable TV system and finally to the television viewer's home.

A flow diagram of the system and method described above can be seen in FIG. 2 and the sources of the numerous latencies that accumulate as video programing is distributed by various known television distribution means is diagramed in FIG. 3.

FIG. 5 illustrates an operational flow 500 representing example operations related to identifying video segments for displaying contextually relevant content. In FIG. 5 and in the following figures that include various examples of operational flows, discussion and explanation may be provided with respect to the above-described examples of FIGS. 1 through 4, and/or with respect to other examples and contexts. However, it should be understood that the operational flows may be executed in a number of other environments and contexts, and/or in modified versions of FIGS. 1 through 4. Also, although the various operational flows are presented in the sequence(s) illustrated, it should be understood that the various operations may be performed in other orders than those which are illustrated, or may be performed concurrently.

After a start operation, the operational flow 500 moves to operation 502. Operation 502 depicts obtaining at least one relation of at least one client and at least one channel. For example, as shown in and/or described with respect to FIGS. 1 through 4, a channel to which a client television is tuned may be determined via determining a video segment viewable by a client television and consulting a media database to determine a channel on which that video segment is being broadcast. The operations by which the video segment is determined may include operations described in a parent application, U.S. patent application Ser. No. 12/788,721 (now U.S. Pat. No. 8,595,781), "METHODS FOR IDENTIFYING VIDEO SEGMENTS AND DISPLAYING CONTEXTUAL TARGETED CONTENT ON A CONNECTED TELEVISION" ("the '781 patent") and/or in related U.S. patent application Ser. No. 14/217,039, "SYSTEMS AND METHODS FOR ADDRESSING A MEDIA DATABASE USING DISTANCE ASSOCIATIVE HASHING" filed concurrently with the instant application ("the related application").

Then, operation 504 depicts receiving one or more indications of a targeted video segment on a monitored channel. For example, as shown in and/or described with respect to FIGS. 1 through 4, an ingest system monitoring one or more channels via a network feed, for example, may detect a video segment of interest being shown on one of the channels. A video segment of interest may be, for example, a particular commercial for which an entity affiliated with the commercial has contracted with an entity operating a central media center to supplement the commercial in real-time or near real-time (i.e. within the first three to five seconds after the commercial begins running on the client TV, ideally within the first few frames of the commercial) with additional content to all client televisions which the central media center has detected are tuned to any channel over which the particular commercial is broadcast. The operations by which the video segment of interest may be detected may include operations described in the '781 patent and/or the related application, whereby the operations may additionally be applied to a context database containing at least hashed information related to the video segments of interest (the aforementioned commercials, e.g.).

Then, operation 506 depicts determining one or more clients associated with the monitored channel, based at least in part on at least one obtained relation of at least one client and at least one channel. For example, as shown in and/or described with respect to FIG. 1 through 4, once a video segment of interest is detected being broadcast on a particular channel as described above, a determination of all client televisions tuned to that particular channel, utilizing data that may have been determined in operation 502, is assessed.

Then, operation 508 depicts providing one or more triggers related to the target video segment to the determined one or more clients. For example, as shown in and/or described with respect to FIG. 1 through 4, utilizing the list of client all client televisions tuned to that particular channel, one or more packets of data are sent to those particular client televisions, the one or more packets of data containing one or more instructions which, when received and/or executed by the client televisions, would cause the client televisions to, for example, display supplemental content related to the video segment of interest. In some embodiments, the client television may, once the video segment of interest (commercial) is received and begins to be rendered on the television, overlay the commercial on the video display with contextually-relevant information. For example, the overlaid information may include supplemental information related to the commercial, such as a special offer associated with a nationally broadcast commercial, the special offer including pricing established for a geographical division within which the TV is included—a first sale price of the item being advertised shown by televisions in one state, for example, and a second sale price of the item different from the first sale price shown by televisions in a different state. Such geographical divisions may be realized, for example, via an IP address of the client television being compared with an ARIN database. Other supplemental content types and/or methods for determining a subset of client televisions for receiving particular supplemental contents are possible. Also, providing supplemental content may mean, for example, instantiating a window on the television display which overlays a program being rendered on that display. In different embodiments, providing the supplemental content may mean rendering content on a different display, or providing the content to a computing device associated with a client television either wirelessly or by wire(s), or sending content to a printer associated with a client television, or burning a CD-ROM or DVD-ROM using a burner associated with a client television, or writing content to a USB key, hard drive, or other storage medium associated with a client television, or any other means of rendering supplemental content on one or more devices within range of the client television.

FIG. 6 illustrates alternative embodiments of the example operational flow 500 of FIG. 5. FIG. 6 illustrates an example embodiment where operation 502 may include at least one additional operation. Additional operations may include operation 602, operation 604, and/or operation 606.

Operation 602 illustrates receiving at least some information related to a content of a video display buffer of at least one client. For example, as shown in and/or described with respect to FIG. 1 through 4, the client television may periodically send "cue data", or indications enabling cue data to be determined. For example, a client television may send one or more indications related to a content of a video display buffer of the client television ten times a second, the one or more indications enabling a determination of a particular program being viewed on that television, using, for example, operations disclosed in the '781 patent and/or the related application, the resulting cue data and/or hash values further enabling a determination of a video segment the client television is watching.

Further, operation 604 illustrates determining, at least partially based on the received at least some information, at least a channel associated with the content and the at least one client. For example, as shown in and/or described with respect to FIG. 1 through 4, once a video segment being rendered by a client television is determined, perhaps in operation 602, a central media center can determine what channel the client television is watching by comparing cue data with a media data store (perhaps via operations disclosed in the '781 patent and/or the related application) to determine the name of a video segment, and then examining stored metadata associated with the determined video segment, the metadata including a particular channel derived from program guides associated with channels monitored by the ingest system (also perhaps via operations disclosed in the '781 patent and/or the related application) to determine the channel to which the client televisions is tuned.

Further, operation 606 illustrates storing the determined channel and an identifier related to the at least one client. For example, as shown in and/or described with respect to FIG. 1 through 4, a real-time or near-real-time listing of all client televisions and all channels to which those client televisions are tuned may be maintained in a data store, using, perhaps, outputs of operation 602 and/or operation 604.

Figure 7:
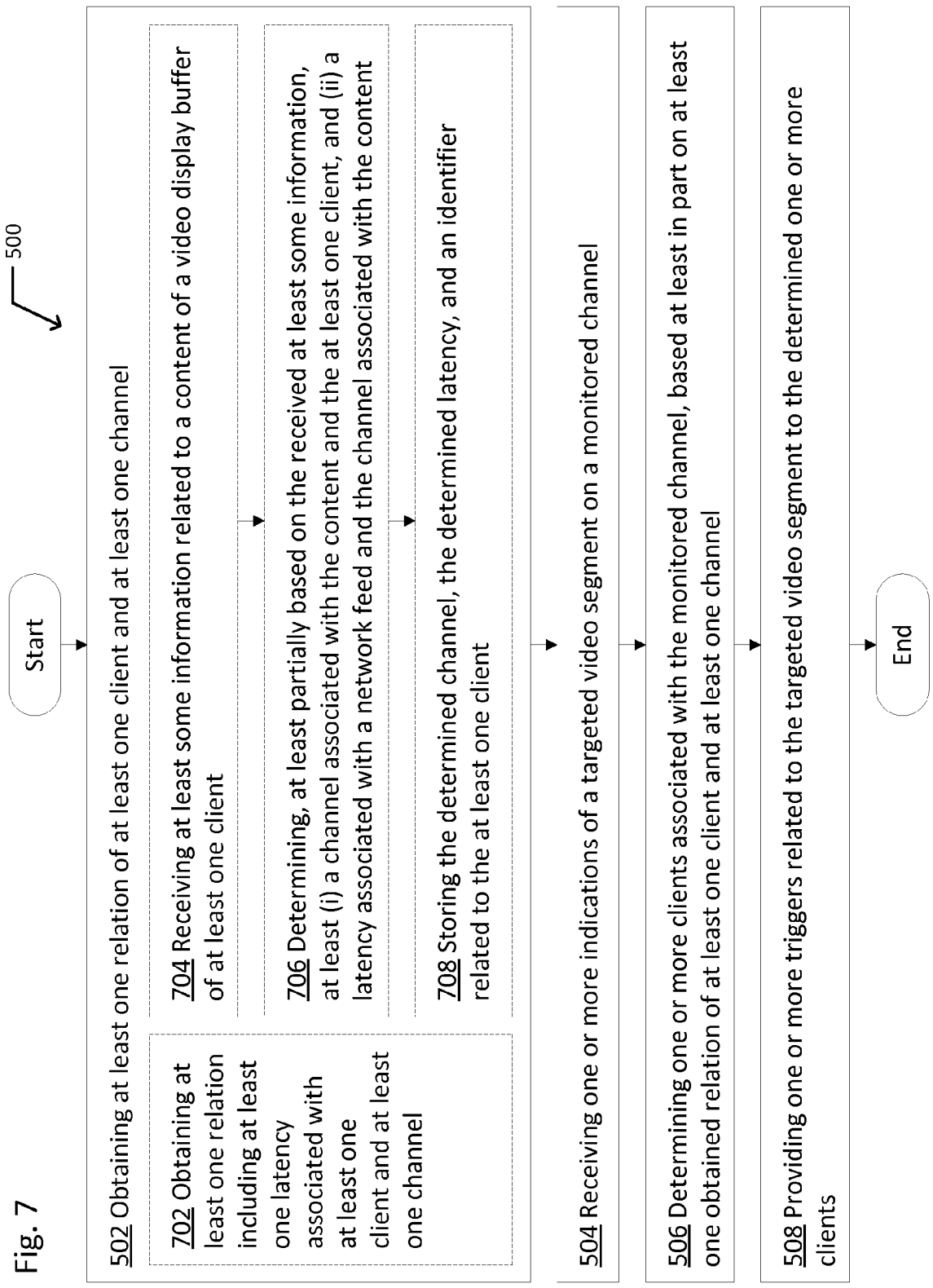
FIG. 7 illustrates an alternative embodiment of the operational flow of FIG. 5.

FIG. 7 illustrates alternative embodiments of the example operational flow 500 of FIG. 5. FIG. 7 illustrates an example embodiment where operation 502 may include at least one additional operation. Additional operations may include operation 702, operation 704, operation 706 and/or operation 708.

Operation 702 illustrates obtaining at least one relation including at least one latency associated with at least one client and at least one channel. For example, as shown in and/or described with respect to FIG. 1 through 4, a central media center may be established "upstream" in the distribution chain from the client televisions, whereby the central media center may, for example, downlink programming directly from a satellite to which a network national distribution center is uplinking that programming. In contrast, by the time the programming is received by a client system (television with OTA antenna and/or an STB, satellite receiver, cable card, etc.), the programming may have been downlinked by, for example, a regional affiliate, who rebroadcasts it over the air, or the regional affiliate's broadcast may in turn be re-transmitted by a cable and/or satellite provider. As a result, given the central media center's upstream position relative to the client systems, the central media center "knows" about a broadcast content several seconds before a client system, since the central media center is not subject to the intervening retransmissions. The difference in time between a central media center obtaining an indication of a particular video segment having been broadcast by a national broadcaster and a client system obtaining an indication of that particular video segment having been broadcast may be several seconds. These several seconds may be referred to as the latency. The client televisions may signal data related to content of their video display buffers ten times a second to the central media server via the Internet, for example. This data may be used at the central media center to determine an exact or near-exact difference in time between a video segment being received by the central media server and that same video segment being received by the client system (perhaps via operations disclosed in the '781 patent and/or the related application). That exact or near-exact difference in time may be related to the latency between the central media center and the client systems.

Further, operation 704 illustrates receiving at least some information related to a content of a video display buffer of at least one client. For example, as shown in and/or described with respect to FIG. 1 through 4, the client television may periodically send "cue data", or indications enabling cue data to be determined. For example, a client television may send one or more indications related to a content of a video display buffer of the client television ten times a second, the one or more indications enabling a determination of a particular program being viewed on that television, using, for example, operations disclosed in the '781 patent and/or the related application, the resulting cue data and/or hash values further enabling a determination of a video segment the client television is watching Further, operation 706 illustrates determining, at least partially based on the received at least some information, at least (i) a channel associated with the content and the at least one client, and (ii) a latency associated with a network feed and the channel associated with the content. For example, as shown in and/or described with respect to FIG. 1 through 4, once a video segment being rendered by a client television is determined, perhaps in operation 704, a central media center can determine what channel the client television is watching by comparing cue data with a media data store (perhaps via operations disclosed in the '781 patent and/or the related application) to determine the name of a video segment, and then examining stored metadata associated with the determined video segment, the metadata including a particular channel derived from program guides associated with channels monitored by the ingest system (also perhaps via operations disclosed in the '781 patent and/or the related application) to determine the channel to which the client televisions is tuned. Additionally, the central media center can also determine the difference in time, either exactly or near-exactly, between the ingest system receiving a video segment and the client system receiving the video segment. The difference in time is useful when providing triggers, in that the trigger data may include an indication of an offset in time after the trigger is received at which time the supplemental content should be provided, the offset in time accounting for the difference in time between the ingest system receiving a video segment and the client system receiving the video segment ("latency") and also an amount of time it will take the trigger to be received at the client system after being sent (the latter amount of time, in other contexts, being called "network latency," the network being the Internet and the latency being the time, usually measured in milliseconds, for a transmission from one Internet node e.g. a central media center to be received at another Internet node e.g. a client television).

Further, operation 708 illustrates storing the determined channel, the determined latency, and an identifier related to the at least one client. For example, as shown in and/or described with respect to FIG. 1 through 4, a real-time or near-real-time listing of all client televisions and all channels to which those client televisions are tuned may be maintained in a data store, using, perhaps, outputs of operation 602 and/or operation 604

Figure 8:
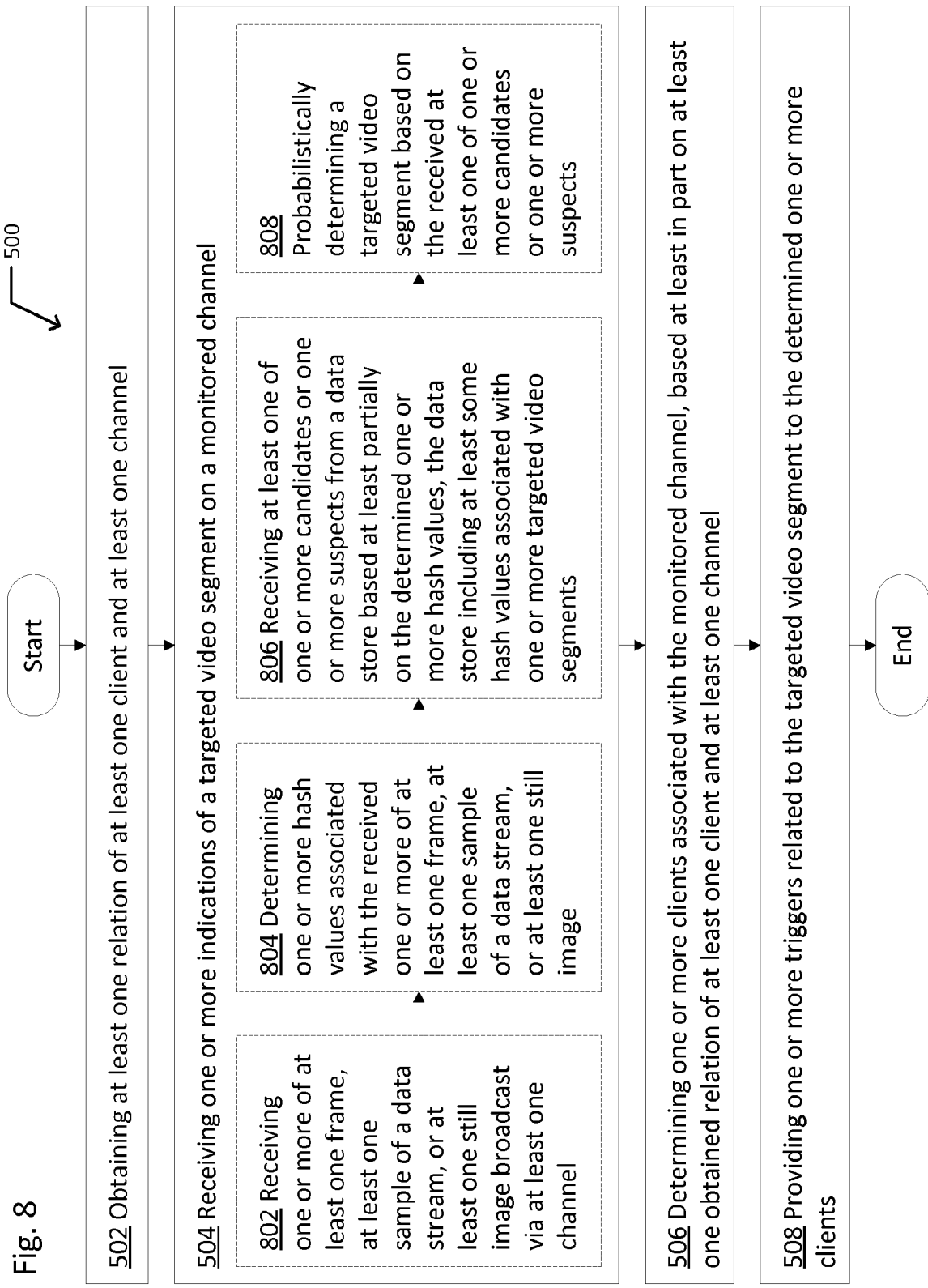
FIG. 8 illustrates an alternative embodiment of the operational flow of FIG. 5.

FIG. 8 illustrates alternative embodiments of the example operational flow 500 of FIG. 5. FIG. 8 illustrates an example embodiment where operation 504 may include at least one additional operation. Additional operations may include operation 802, operation 804, operation 806 and/or operation 808.

Operation 802 illustrates receiving one or more of at least one frame, at least one sample of a data stream, or at least one still image broadcast via at least one channel. For example, as shown in and/or described with respect to FIG. 1 through 4, an ingest system monitoring one or more channels, perhaps via downlinking transmissions from a satellite to which network national broadcast centers uplink programming, may receive such downlinked transmissions as a sequence of frames of video, the frames of video alternately being referred to as sequential still images, 30 still images per second in sequence comprising NTSC, PAL, SECAM, HDTV, or other current and/or future standards for video data. In different embodiments, different frame rates are possible e.g. 24 images per second, 60 images per second, or other rates at which a data stream is sampled. The ingest system, in short, examines every frame received from one or more channels, which may be 10, 200, 500, 1000, or more channels all downlinked simultaneously at the central media center.

Further, operation 804 illustrates determining one or more hash values associated with the received one or more of at least one frame, at least one sample of a data stream, or at least one still image. For example, as shown in and/or described with respect to FIG. 1 through 4, a hash value associated with the one or more of at least one frame, at least one sample of a data stream, or at least one still image is determined, perhaps via operations disclosed in the '781 patent and/or the related application, the hash value capable of identifying a particular video segment, perhaps uniquely or perhaps in conjunction with a plurality of hash values associated with other frames of a particular downlinked feed.

Further, operation 806 illustrates receiving at least one of one or more candidates or one or more suspects from a data store based at least partially on the determined one or more hash values, the data store including at least some hash values associated with one or more targeted video segments. For example, as shown in and/or described with respect to FIG. 1 through 4, a hash value may be used to receive one or more suspects or candidates from a data store, perhaps via operations disclosed in the '781 patent and/or the related application. Differently, in the instant operational flow, the suspects and/or candidates may be retrieved from a data store specific to targeted video segments. As described above, a targeted video segment and/or a video segment of interest may be, for example, a particular commercial for which an entity affiliated with the commercial has contracted with an entity operating a central media center to supplement the commercial in real-time or near real-time (i.e. within the first three to five seconds after the commercial begins running on the client TV, ideally within the first few frames of the commercial) with additional content to all client televisions which the central media center has detected are tuned to any channel over which the particular commercial is broadcast. Data associated with such commercials may be stored in a data store, perhaps, for example, a context data store and/or a video segment database.

Further, operation 808 illustrates probabilistically determining a targeted video segment based on the received at least one of one or more candidates or one or more suspects. For example, as shown in and/or described with respect to FIG. 1 through 4, the one or more candidates or suspects may be placed in bins and/or time bins and values associated with the bins or time bins may be incremented and/or decremented, perhaps via tokens, and perhaps via operations disclosed in the '781 patent and/or the related application and applied to a context data store and/or a video segment database to identify a particular targeted video segment of interest being broadcast on a channel monitored via the downlinked feeds at the central media center.

Figure 9:
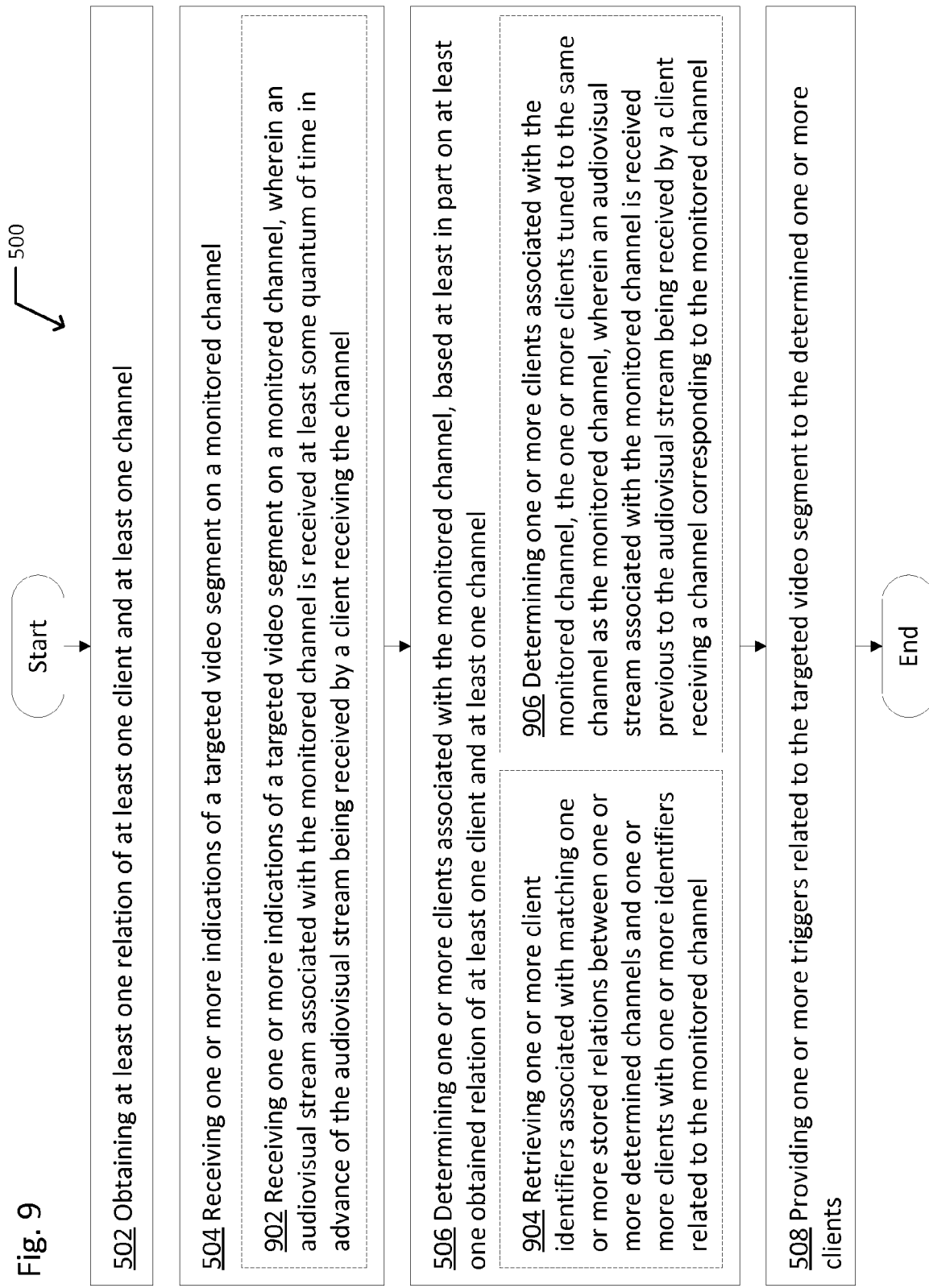
FIG. 9 illustrates an alternative embodiment of the operational flow of FIG. 5.

FIG. 9 illustrates alternative embodiments of the example operational flow 500 of FIG. 5. FIG. 9 illustrates an example embodiment where operation 504 may include at least one additional operation, including operation 902. FIG. 9 also illustrates an example embodiment where operation 506 may include at least one additional operation. Additional operations may include operation 904 and/or operation 906.

Operation 902 illustrates receiving one or more indications of a targeted video segment on a monitored channel, wherein an audiovisual stream associated with the monitored channel is received at least some quantum of time in advance of the audiovisual stream being received by a client receiving the channel. For example, as shown in and/or described with respect to FIG. 1 through 4, due to latency associated with the central media center being "upstream" from the client televisions, a video segment broadcast on a channel may be received via a downlink of a network feed of that channel at the central media center in advance of that same video segment being received at a client television tuned to that channel. The latency results in the video segment being received at the central media center at some quantum of time in advance of the video segment being received at a client television. In that quantum of time, using systems and/or methods described elsewhere herein and/or in a parent or related application or patent, it is possible for the central media center to: determine a video segment of interest being broadcast on any of the channels it is monitoring via downlinking the network uplink; determine all TVs tuned to that channel utilizing cue data having been previously and/or substantially contemporaneously (within the past five, ten, fifteen, or more seconds) transmitted to the central media center, perhaps ten times per second per TV; and emit one or more trigger-associated indications to all TVs tuned to that channel. In some embodiments, a trigger may include at least some of the supplemental content. In different embodiments, the supplemental content may have been previously received by the client television or system (perhaps several seconds before, perhaps the night before, perhaps at manufacture of the client television or system, or perhaps at some intermediate time).

Further, operation 904 illustrates retrieving one or more client identifiers associated with matching one or more stored relations between one or more determined channels and one or more clients with one or more identifiers related to the monitored channel. For example, as shown in and/or described with respect to FIG. 1 through 4, once a video segment of interest is determined to be being broadcast on a particular channel being monitored, a list of all client televisions tuned to that particular channel is retrieved and/or provided. Importantly, the client televisions tuned to that particular channel are not receiving the channel via the same network feed as the central media center, but rather are receiving the channel via that network feed having been re-transmitted downstream of the satellite from which the central media center downlinks the feed.

Further, operation 906 illustrates determining one or more clients associated with the monitored channel, the one or more clients tuned to the same channel as the monitored channel, wherein an audiovisual stream associated with the monitored channel is received previous to the audiovisual stream being received by a client receiving a channel corresponding to the monitored channel. For example, as shown in and/or described with respect to FIG. 1 through 4, since the client televisions tuned to that particular channel are not receiving the channel via the same network feed as the central media center, but rather are receiving the channel via that network feed having been re-transmitted downstream of the satellite from which the central media center downlinks the feed, a given monitored channel's programming is received at the central media center previous to the programming being received by the client television via a corresponding channel. In the instant case, "channel" refers to a particular programming stream and not necessarily to a particular frequency or signal transmission. Indeed, the instant invention is operable because the central media center and the clients are receiving the programming streams via different frequencies or via different signal transmissions. The central media center may, for example, be receiving the programming stream (the ESPN "channel", for instance), via a satellite dish tuned to a frequency in the C-band satellite frequency range (3.7 GHz, for example), whereby a client television system may be receiving the same programming stream (the ESPN "channel") via receiving it over a cable television distribution network operating on a North American cable television frequency of, for example, 409.25 MHz. In the context of the instant application, "channel" refers to the name of a programmer and/or broadcaster and/or affiliate, whereby a frequency refers to the portion of the electromagnetic spectrum over which an audiovisual broadcast stream comprising a particular channel (ESPN, say) is transmitted by a broadcaster and/or received by a client television either wirelessly or via wire(s).

Figure 10:
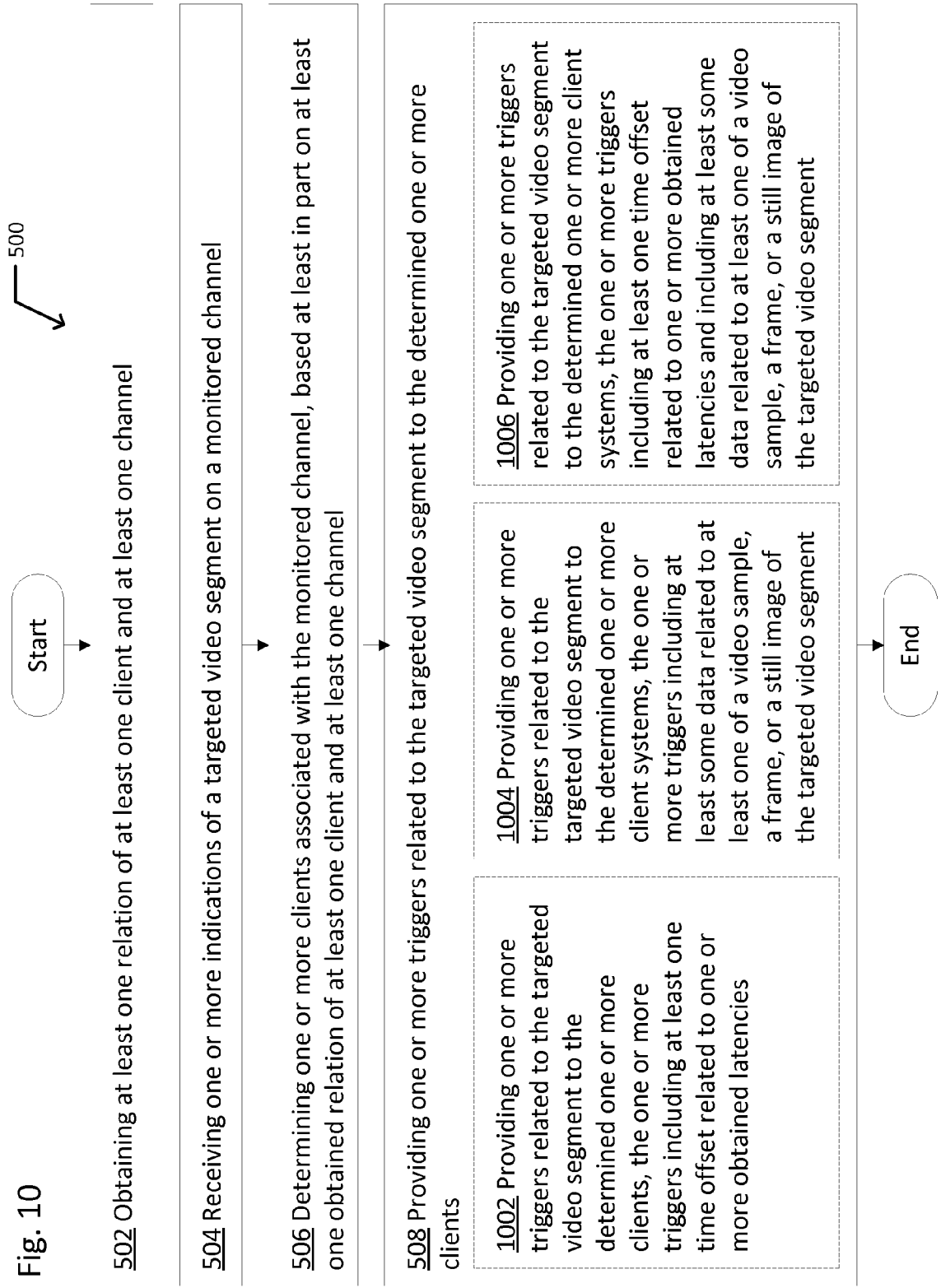
FIG. 10 illustrates an alternative embodiment of the operational flow of FIG. 5.

FIG. 10 illustrates alternative embodiments of the example operational flow 500 of FIG. 5. FIG. 10 illustrates an example embodiment where operation 508 may include at least one additional operation. Additional operations may include operation 1002, operation 1004, and/or operation 1006.

Operation 1002 illustrates providing one or more triggers related to the targeted video segment to the determined one or more clients, the one or more triggers including at least one time offset related to one or more obtained latencies. For example, as shown in and/or described with respect to FIG. 1 through 4, utilizing a list of client all client televisions tuned to that particular channel, one or more packets of data are sent to those particular client televisions, the one or more packets of data containing one or more instructions which, when received and/or executed by the client televisions, would cause the client televisions to, for example, display supplemental content related to the video segment of interest. In some embodiments, the client television may, once the video segment of interest (commercial) is received and begins to be rendered on the television, overlay the commercial on the video display with contextually-relevant information. For example, the overlaid information may include supplemental information related to the commercial, such as a special offer associated with a nationally broadcast commercial, the special offer including pricing established for a geographical division within which the TV is included—a first sale price of the item being advertised shown by televisions in one state, for example, and a second sale price of the item different from the first sale price shown by televisions in a different state. Such geographical divisions may be realized, for example, via an IP address of the client television being compared with an ARIN database. Other supplemental content types and/or methods for determining a subset of client televisions for receiving particular supplemental contents are possible. Particularly, the trigger data may further include and/or be associated with a particular quantum of time and/or a particular time at which the client should provide the supplemental content. The quantum of time and/or particular time may be established in view of latency determined to exist between the central media center and the client TV which is at least in part due to the upstream location of the central media center relative to the client TV.

Further, operation 1004 illustrates providing one or more triggers related to the targeted video segment to the determined one or more client systems, the one or more triggers including at least some data related to at least one of a video sample, a frame, or a still image of the targeted video segment. For example, as shown in and/or described with respect to FIG. 1 through 4, an indication is sent to client systems (televisions, set-top boxes, computing devices, media players, etc. which have the client app and/or widget present, the app or widget in communication with a central media center) of a video segment of interest being broadcast on the channel which is anticipated to arrive at the client systems during or at the end of the latency period. The data may include, for example, a time at which the client system should provide supplemental content, or a time delay after which the trigger is received at the client before the supplemental content is to be provided.

Further, operation 1006 illustrates providing one or more triggers related to the targeted video segment to the determined one or more client systems, the one or more triggers including at least one time offset related to one or more obtained latencies and including at least some data related to at least one of a video sample, a frame, or a still image of the targeted video segment. For example, as shown in and/or described with respect to FIG. 1 through 4, a trigger may be associated with data relating to a particular frame of the video segment of interest. In some embodiments, the trigger may include pixel data associated with a frame, a subset of the pixel data associated with the frame, or an encoded value such as a hash value associated with the frame. The data relating to a particular frame of the video segment of interest may be, for example, related to the very first frame (or a frame in close proximity to the first frame—within the first ten frames e.g.) of the video segment of interest. The data may be used by the client system to detect the actual start of the video segment of interest locally. For example, the client system may utilize the data and a matching algorithm, checking the data received about the video segment of interest against frames which are subsequently received in the data stream. In an alternate embodiment, data relating to the particular frame of the video segment of interest may have been previously transmitted to the app and/or widget with an identifier, and the subsequent trigger, rather than including pixel data or hash values may merely include the identifier.

Figure 11:
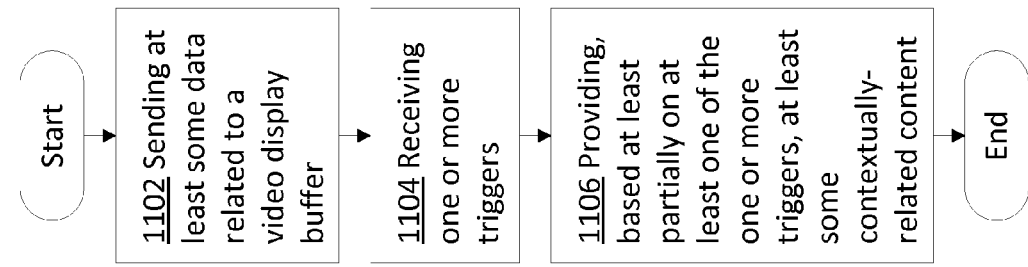
FIG. 11 illustrates a different operational flow representing example operations related to identifying video segments for displaying contextually relevant content.

FIG. 11 illustrates an operational flow 1100 representing example operations related to identifying video segments for displaying contextually relevant content. In FIG. 11 and in following figures that include various examples of operational flows, discussion and explanation may be provided with respect to the above-described examples of FIGS. 1 through 4, and/or with respect to other examples and contexts. However, it should be understood that the operational flows may be executed in a number of other environments and contexts, and/or in modified versions of FIGS. 1 through 4. Also, although the various operational flows are presented in the sequence(s) illustrated, it should be understood that the various operations may be performed in other orders than those which are illustrated, or may be performed concurrently.

After a start operation, the operational flow 1100 moves to operation 1102. Operation 1102 depicts sending at least some data related to a video display buffer. For example, as shown in and/or described with respect to FIGS. 1 through 4, a client system may send one or more indications related to a content of the video display buffer, the content representing a frame, still image, or sample of a video data stream which is being displayed or is about to be displayed on the display of the television. The one or more indications may relate to pixel data of the frame, still image, or sample of a video data stream, or a subset of the pixel data, or be an encoded value related to the frame, still image, or sample of a video data stream, such as a hash value determined, perhaps, via operations disclosed in the '781 patent and/or the related application. The data may be sent periodically, perhaps 10 times per second (every third frame). The data may be sent aperiodically, randomly, according to a bandwidth availability, or at some other regular or irregular interval. The data does not have to be sent at the same rate at which data is stored by an ingest system at a central media server.

Then, operation 1104 depicts receiving one or more triggers. For example, as shown in and/or described with respect to FIGS. 1 through 4, a client system will receive one or more indications from a central media center of a video segment of interest which is about to be received by the client system, the one or more triggers including at least an indication of the supplemental content to provide and a time at which the supplemental content should be provided. The supplemental content may have been received prior to the television being turned on by a user, during a period of low-usage, for example, in which instance the trigger would indicate which supplemental content that had been previously received to provide. Or, the trigger may include at least some of the supplemental content.

Then, operation 1106 depicts providing, based at least partially on at least one of the one or more triggers, at least some contextually-related content. For example, as shown in and/or described with respect to FIG. 1 through 4, the client system may provide content related to the video segment of interest, which could include local pricing related to a geographical division in which the client system is located which is intended to supplement an advertisement of interest that is about to be received and rendered by the client television (i.e. the content relates to the context of the advertisement). The supplemental content may be provided in any manner including those described with respect to operation 508 and includes, but is not limited to, instantiating a window overlaying the video, the window including a message related to the underlying advertisement or other contextually-related content.

Figure 12:
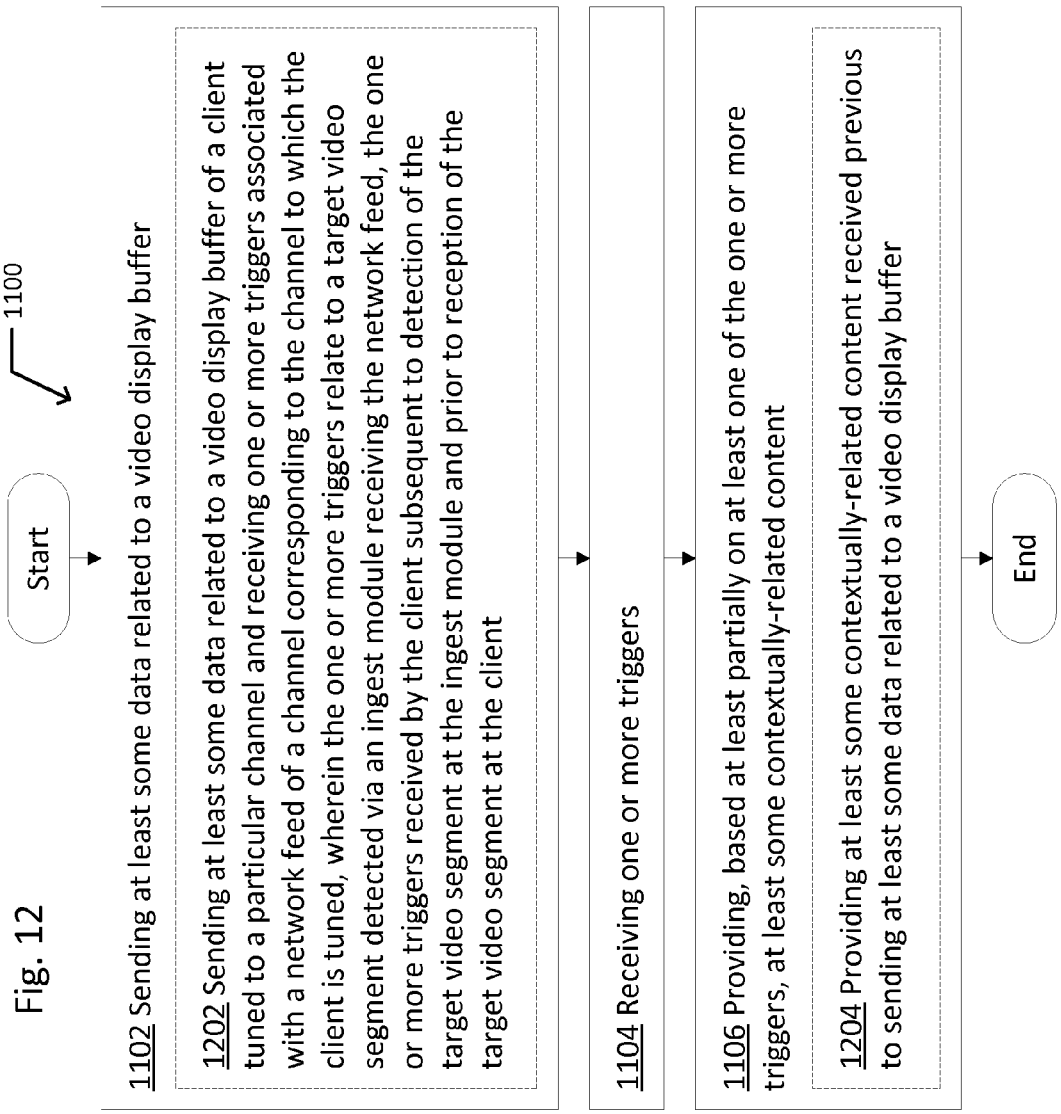
FIG. 12 illustrates an alternative embodiment of the operational flow of FIG. 11.

FIG. 12 illustrates alternative embodiments of the example operational flow 1100 of FIG. 11. FIG. 12 illustrates an example embodiment where operation 1102 may include at least one additional operation, including operation 1202. FIG. 12 also illustrates an example embodiment where operation 1106 may include at least one additional operation, including operation 1204.

Operation 1202 illustrates sending at least some data related to a video display buffer of a client tuned to a particular channel and receiving one or more triggers associated with a network feed of a channel corresponding to the channel to which the client is tuned, wherein the one or more triggers relate to a target video segment detected via an ingest module receiving the network feed, the one or more triggers received by the client subsequent to detection of the target video segment at the ingest module and prior to reception of the target video segment at the client. For example, as shown in and/or described with respect to FIG. 1 through 4, Further, operation 1204 illustrates providing at least some contextually-related content received previous to sending at least some data related to a video display buffer. For example, as shown in and/or described with respect to FIG. 1 through 4, a latency period may exist between the time that a particular frame of an audiovisual datastream on a channel is received at an ingest system of a central media center, and the time that the same particular frame of the audiovisual datastream on the channel is received by a client television. Between those two points in time, a particular video segment of interest being broadcast on a channel may be detected at the central media center, a listing of televisions tuned to that channel may be generated, and triggers relating to the video segment of interest are sent to all the televisions on the list, the triggers being received prior to the time that the video segment of interest is received at the client systems. This may be, for example, because it takes several seconds for the video segment of interest to propagate through the various distribution and/or retransmission means between the network uplink and the client television, whereas the client system and central media center may be in communication via the Internet, offering faster end-to-end data throughput rates than the distribution and/or retransmission means. Should the trigger arrive after the start of the video segment at the client system (perhaps due to Internet latency), the instructions associated with the trigger may still be executed by the client system provided the video segment of interest is still being rendered by the client system.

FIG. 13 illustrates alternative embodiments of the example operational flow 1100 of FIG. 11. FIG. 13 illustrates an example embodiment where operation 1106 may include at least one additional operation. Additional operations may include operation 1302, operation 1304, operation 1306, and/or operation 1308. FIG. 13 further illustrates an example embodiment where operation 1306 may include at least one additional operation, including operation 1310.

Operation 1302 illustrates determining a time at which to provide the contextually-related content based at least partially on at least one of the one or more triggers. For example, as shown in and/or described with respect to FIG. 1 through 4, the trigger may include an indication of a time at which supplemental content should be provided based upon a detected difference in time between a central media center receiving a frame and the client system subsequently receiving that frame. In some embodiments, the trigger may include a literal time at which to provide the supplemental content (e.g. 8 hours, 30 seconds, and 100 milliseconds Greenwich Mean Time on Mar. 17, 2014). In different embodiments, the trigger may include a time delta (e.g. instructing the client system to provide the supplemental content exactly 2500 milliseconds after the trigger is received, wherein 2500 milliseconds is a value unique to the client system which is established by the central media center to account for broadcast-path latency based on a determination of how far the client system is lagging behind the central media center in receiving content from a particular channel).

Further, operation 1304 illustrates providing the contextually-related content at the determined time. For example, as shown in and/or described with respect to FIG. 1 through 4, based upon data from operation 1302, the supplemental and/or contextually-related content is provided at the determined time. In some embodiments, the determined time is established to be synchronized with the start of a commercial of interest (e.g. concurrently with the first frame, substantially concurrently with the first frame meaning within the first ten frames, first 30 frames, first five seconds, etc.). In different embodiments, the determined time is established to be synchronized with a particular point within the commercial of interest—halfway, for example, or after a particular scene has been rendered, or towards the end of the commercial.

Further, operation 1306 illustrates identifying a target frame, the target frame including at least one of a video sample, a frame, or a still image of the targeted video segment, the target frame associated with the received trigger. For example, as shown in and/or described with respect to FIG. 1 through 4, a trigger may include data associated with the first frame of the video segment of interest so that the client system. In different embodiments, a frame of the video segment of interest other than the first frame may be selected as a target frame. For example, the target frame may be selected as the first frame of the video segment that enables a positive identification at the client system. The target frame may be, for example, the first non-black frame in the video segment of interest. In other embodiments, the target frame may be selected from the middle of the video segment of interest, the target frame selected to coincide with a particular point during the video segment of interest at which the supplemental content is to be provided.

Further, operation 1308 illustrates comparing at least some data associated with a video display buffer with at least some data associated with the identified target frame and, if the at least some data associated with a video display buffer matches the at least some data associated with the identified target frame, providing the contextually-related content. For example, as shown in and/or described with respect to FIG. 1 through 4, the client system may compare data associated with each frame subsequently received via the channel with the data associated with the first frame of the video segment of interest. If a match is found, that may indicate the start of the video segment of interest at the client system at which time the client system would provide the supplemental content.

Further, operation 1310 illustrates identifying a target frame, the target frame including at least one of a video sample, a frame, or a still image of the targeted video segment and at least one of received substantially contemporaneously with the trigger or received previous to sending at least some data related to a video display buffer. For example, as shown in and/or described with respect to FIG. 1 through 4, as described elsewhere herein, the data associated with the target frame can be received with the trigger (substantially contemporaneously) and may be pixel data taken from the frame, or may be an identifier which links to frame data about all video segments of interest received at the client system previous to the client system being watched (the previous night, for example, or at manufacture of the client system, or during a network update of the client system).

FIG. 14 illustrates alternative embodiments of the example operational flow 1100 of FIG. 11. FIG. 14 illustrates an example embodiment where operations 1306 and 1308 may include at least one additional operation, including operation 1402.

Operation 1402 illustrates iteratively comparing at least some data associated with a video display buffer with at least some data associated with the identified target frame for at least one period of time and, if the at least some data associated with a video display buffer does not match the at least some data associated with the identified target frame within the at least one period of time, providing the contextually-related content. For example, as shown in and/or described with respect to FIG. 1 through 4, the two different manners of indicating when to provide the supplemental content (instructing the client system to provide it at a particular time, or instructing the client system to watch for a particular frame and then provide the supplemental content) may back one another up. For example, the client system, having received an indication of a target frame which, when received, would indicate to the client system that it is time to provide the supplemental content, may match every frame in the received datastream for a period of time. If a match is not made within the period of time, the client system may provide the supplemental content as a failsafe against the matching process having not found a match, or perhaps the matching process beginning after the target frame having been received. The period of time may be, for example, a time delta associated with the trigger and based at least partially on the detected latency. In different embodiments, one or the other of the two different manners of indicating when to provide the supplemental content may provide a more reliable means of providing the content closest to the start of the video segment of interest. For example, if Internet latency is a problem and triggers are received at inconsistent points relative to the start of the video segment of interest, the target frame matching may provide a more reliable indication of the start of the segment of interest.

Figure 15:
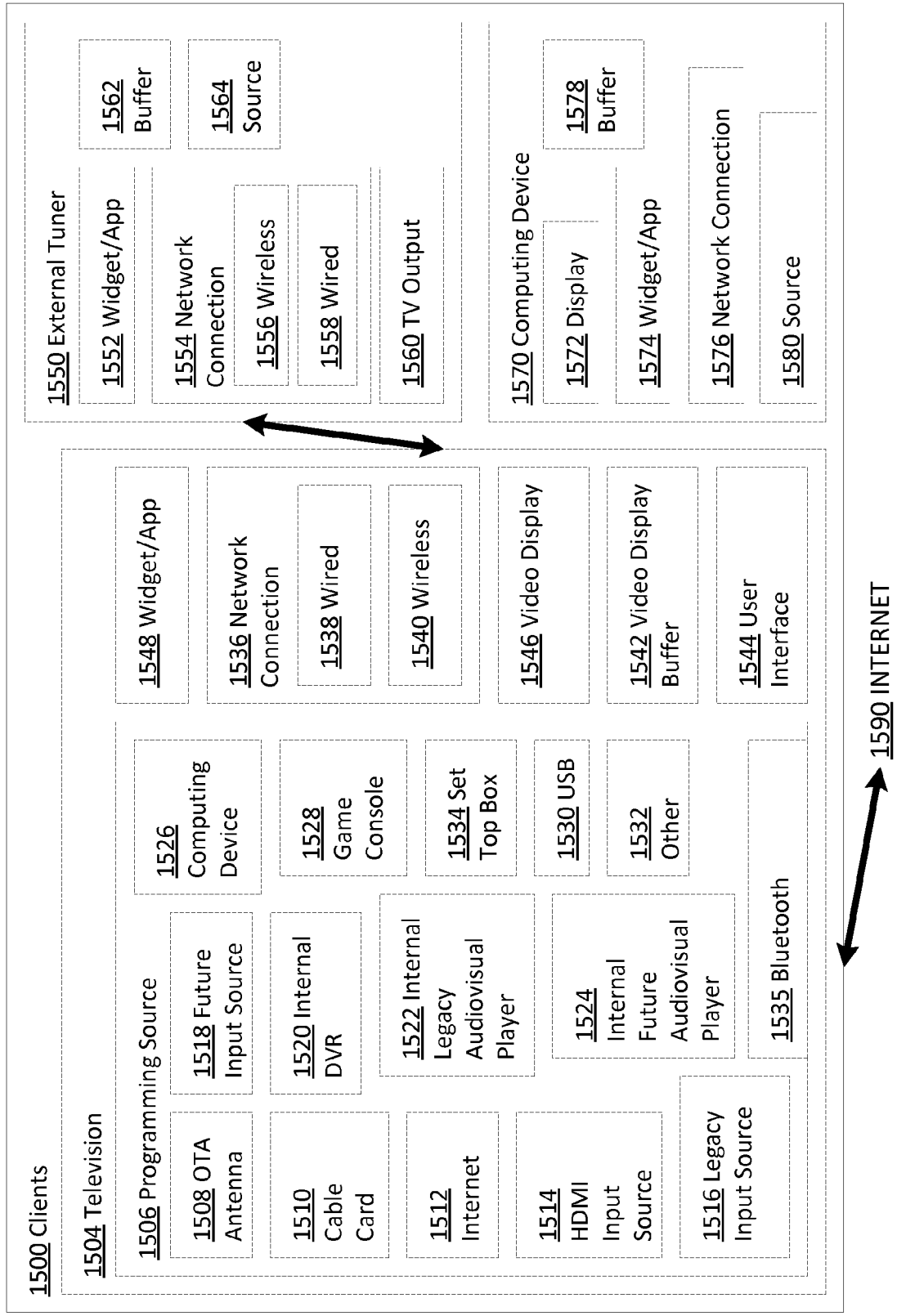
FIG. 15 illustrates a portion of an exemplary system related to identifying video segments for displaying contextually relevant content.

FIG. 15 illustrates a portion of an exemplary system related to identifying video segments for displaying contextually relevant content. FIG. 15 depicts one or more clients 1500 as shown in and/or described with respect to FIG. 1 through 4. The clients may be connected to the Internet 1590. In some embodiments, a client is a television 1504. The client television may be a smart television, including a network connection 1536, which may be a wired network connection (an RJ-45 Ethernet connection over Cat 5, e.g.) or a wireless connection (802.11 Wi-Fi, e.g.). The smart television may have at least one of a widget or an application 1548 which is executed concurrent with the smart television rendering received program content, perhaps via operations disclosed in the '781 patent and/or the related application. The widget or app may connect using the network connection to the Internet and be in communication with a central media server 1600 (not pictured in FIG. 15 but shown in FIG. 16). The smart television may have a video display 1546 (e.g. a 55" LED display), the video display couplable with a video display buffer 1542, the video display buffer being a memory containing data related to one or more frames which are to be displayed via the display. The data may include pixel data related to the one or more frames. The smart television may also have a user interface 1544 for controlling the television and/or for receiving and/or interacting with the supplemental content. In some embodiments, the user interface may be rendered via a window overlaying a portion the image data from the received program on the display (the top right corner, e.g.), or via a window overlaying the entire screen. In other embodiments, the user interface may also be rendered via an auxiliary display coupled with the television, or on a device operatively coupled with the smart television (tablet, printer, computing device, audio system, second television, etc.).

In some embodiments, where television 1504 is a smart television, the television will render content associated with a programming source internal to the smart television. For example, the smart television may render content received over an over-the-air antenna 1508, a cable card 1510, or the internet 1512 (via an app such as Aereo, e.g.).

In some embodiments, the smart television may render programming content received from an external system via an input connection of the smart television, e.g. an HDMI input source 1514; via a legacy input source 1516 such as composite video, S-Video, or component video; or via a future input source (HDMI 2.0, MHL, etc.). In other embodiments, the smart television may render programming content via a DVR 1520 which is internal to the smart television, or via another legacy audiovisual player 1522 such as a DVD player or VCR internal to the television, or a future audiovisual player 1524 which is internal to the television. The smart television may render content via a computing device 1526, such as a Media Center PC or a PC with a tuner card installed, the computing device connected with the television via HDMI, DVI, VGA, or other appropriate connection. The smart television may also render content via a game console 1528 which has a tuner, or an application such as Aereo, etc. The smart television may also render content received via a Set Top Box (STB) 1534, which may be a DVR, external tuner such as a satellite or cable receiver, or may be an external digital HDTV receiver used to receive and render digital content on an older television designed for receiving analog stations. The smart television may render content received via USB 1530 or Bluetooth 1535, including dongles or devices which include tuners or apps such as Aereo, or stored program content on a USB drive, e.g. In other embodiments, the smart television may render content received via an "other" source 1532.

In different embodiments, television 1504 may be a television without a network connection. The television may have an external tuner 1550, which may have at least one of widget or app 1552 resident. The external tuner may have a network connection 1554, which may be wireless 1556 or wired 1558, and have an output capability 1560 to the television (HDMI, e.g.). The external tuner may have a buffer 1562 that is analogous to the video display buffer 1542 in a smart television (e.g. be a memory through which pixel data related to frames of video passes). The external tuner may also have a program source 1564, such as a digital tuner receiving OTA signals, cable card, satellite receiver, Aereo application, etc. In such embodiments, the external tuner coupled with the television without a network connection is in communication via its network connection with a central media center 1600. In some embodiments, the external tuner may also have the ability to play DVDs or VHS tapes, be a game console, or a Media Center PC, or a PC with a tuner card installed, etc.

In other embodiments, a computing device 1570 rendering content is in communication with the central media center 1600 via network connection 1576. In some embodiments, a computing device has a display 1572, such as an iPad tablet with a Retina display, or a personal computer with an LCD VGA monitor attached. The computing device may have a source of programming 1580. The computing device may run an application like Aureo, or may receive streaming video content related to a particular channel. For example, the tablet or PC may be used by a traveler who has a streaming connection to a cable box at the user's home, or to a Slingbox, or whose cable contract for the user's home television also permits the user to log in with a computing device to receive the cable channels. There may be a buffer 1578 associated with pixel data that is to be rendered via display 1572. The computing device may also have a widget or app 1574 in communication with the central media center, enabling supplemental content to be provided in conjunction with programming content received at the computing device, perhaps via a window overlaid on an Aureo window on the tablet.

Figure 16:
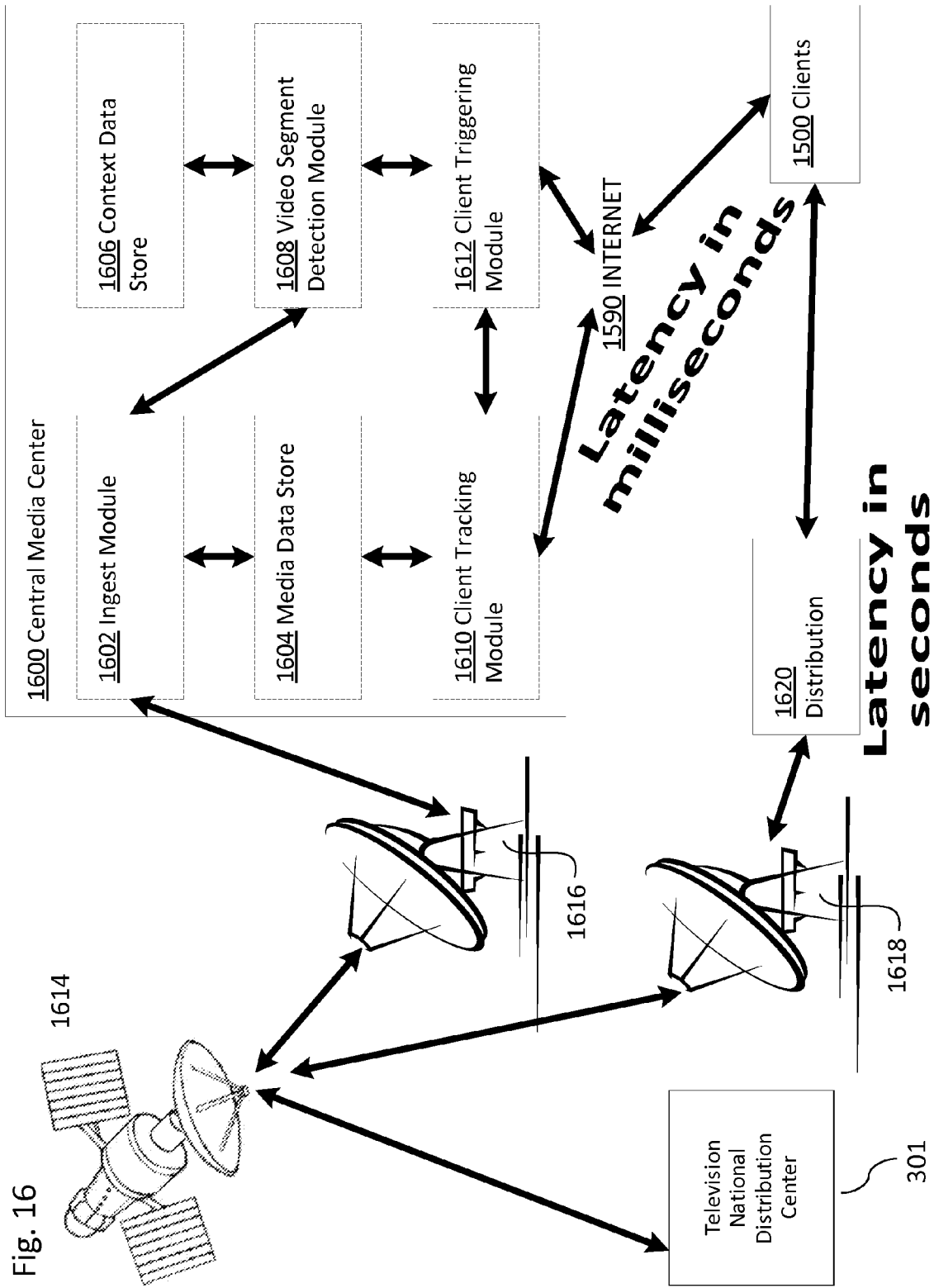
FIG. 16 illustrates a portion of an exemplary system related to identifying video segments for displaying contextually relevant content.

FIG. 16 illustrates a portion of an exemplary system related to identifying video segments for displaying contextually relevant content. FIG. 16 depicts a central media center 1600 as shown in and/or described with respect to FIG. 1 through 4. The central media center may be connected to the Internet 1590, facilitating communications with clients 1500. There may be a single central media center, or there may be multiple central media centers. There may be a disaster recovery site, for example, or central media centers may be distributed geographically such that communications with a subset of clients are geographically distributed about the central media centers. Or, central media centers may be divided based on subsets of channels being monitored. Alternatively, some combination of the foregoing may be employed for providing one or more central media centers.

The central media center 1600 has an ingest module 1602, which receives programming from a number of channels, perhaps by downlinking the content via satellite connection 1616, the downlink being of an uplink provided by a television national distribution center 301 for particular channels, the uplink and downlink being via satellite 1614. Also downlinking from satellite 1614 may be a local network affiliate, for example, or a cable system headend, either of which may use satellite connection 1618. In different embodiments, programming data from a television national distribution center may be delivered via a fiber optic connection or other suitable connection other than satellite. Distribution 1620 is intended to represent the various intermediary uplinks, downlinks, retransmissions, and local distribution of programming content between the television national distribution center and the client television. An example of the distribution is depicted in FIG. 3, and a latency associated with the distribution may usually be measured in seconds (3, 5, 7, 10 seconds or more, for example).

Data associated with programming streams received via the ingest module 1602 is maintained in a media data 1604. The frames of the programming streams may be hashed, perhaps via operations disclosed in the '781 patent and/or the related application, and metadata associated with the programming streams (program titles from a channel guide, and/or an indication of the channel from which the programming was received, for example) may be associated with the hash values such that a particular hash value may be used to identify a title of a program or a channel on which the program is broadcast. Data associated with programming streams received via the ingest module is also processed by video segment detection module 1608, which is in communication with context data store 1606. The context data store, or video segment database 104 of FIGS. 1 and 4, may have information related to video segments of interest (commercials, e.g.). The video segment detection module examines data associated with frames received via the ingest module to determine whether the frame is associated with a video segment of interest using data associated with the video segments of interest stored in the context data store.

Separately, client tracking module 1610 receives data from clients 1500 over the Internet. The data may be associated with contents of video display buffers of the clients, and may be used to determine a channel to which the client is tuned using operations disclosed elsewhere herein. The client tracking module, in communication with the media data store 1604, may therefore maintain a listing of all clients which are active and the channels to which the clients are tuned.

If a video segment of interest is detected by the video segment detection module 1608, the client triggering module 1612 may send one or more indications of triggers to the clients 1500, perhaps using a listing of clients tuned to a particular channel which is showing the video segment of interest, the listing of clients received from client tracking module 1610 or compiled using data associated with client tracking module 1610. The triggers are sent via Internet connection 1590. Communication between the central media center and clients may be sent and received in a period of milliseconds (the Internet latency), whereby a difference in time between a video segment of interest being received at the central media center 1600 and that video segment being received at the clients may be measured in seconds (the broadcast latency) due at least partially to the distribution, redistribution, transmission, retransmission, uplinking, and downlinking that occurs between the time a television national distribution center 301 uplinks a program and the time the uplinked program is eventually received by a client.

The system and methods, flow diagrams, and structure block diagrams described in this specification may be implemented in computer processing systems including program code comprising program instructions that are executable by a computer processing system. Other implementations may also be used. Additionally, the flow diagrams and structure block diagrams herein described describe particular methods and/or corresponding acts in support of steps and corresponding functions in support of disclosed structural means, may also be utilized to implement corresponding software structures and algorithms, and equivalents thereof.

Embodiments of the subject matter described in this specification can be implemented as one or more computer program products, i.e., one or more modules of computer program instructions encoded on a tangible program carrier for execution by, or to control the operation of, data processing apparatus. The computer readable medium can be a machine readable storage device, a machine readable storage substrate, a memory device, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a suitable communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Processors suitable for the execution of a computer program include, by way of example only and without limitation, both general and special purpose microprocessors, and any one or more processors of any kind of digital computer. Generally, a processor will receive instructions and data from a read only memory or a random access memory or both.

To provide for interaction with a user or manager of the system described herein, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. For example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes back end component(s) including one or more data servers, or that includes one or more middleware components such as application servers, or that includes a front end component such as a client computer having a graphical user interface or a Web browser through which a user or administrator can interact with some implementations of the subject matter described is this specification, or any combination of one or more such back end, middleware, or front end components. The components of the system can be interconnected by any form or medium of digital data communication, such as a communication network. The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method, comprising:
   maintaining at least one store of relations of clients and channels, including at least:
      receiving one or more of at least some cue data, at least some pixel data, or at least one hash value related to at least one client;
      determining, at least partially based on the received one or more of at least some cue data, at least some pixel data, or at least one hash value, (is) at least one channel associated with the at least one client and (ii) at least one latency associated with at least one network feed and the determined at least one channel; and
      storing at least one relation including at least the determined at least one channel, the determined at least one latency, and at least one identifier related to the at least one client;
   receiving at least one indication of at least one targeted video segment on at least one monitored channel;
   determining one or more clients associated with the at least one monitored channel at least partially based on one or more stored relations of clients and channels; and
   preparing one or more client triggers related to the at least one targeted video segment, the prepared one or more client triggers including at least (a) one or more time offsets related to latencies associated with the determined one or more clients and (b) one or more instructions associated with providing contextually-related content at one or more times related to the one or more time offsets.

2. The method of claim 1, wherein the receiving one or more of at least some cue data, at least some pixel data, or at least one hash value related to at least one client comprises:
   receiving one or more of at least some cue data, at least some pixel data, or at least one hash value, the received one or more of at least some cue data, at least some pixel data, or at least one hash value related to at least one patch of pixels associated with at least one content of at least one video display buffer of the at least one client.

3. The method of claim 1, wherein the receiving one or more of at least some cue data, at least some pixel data, or at least one hash value related to at least one client comprises:
   receiving the one or more of at least some cue data, at least some pixel data, or at least one hash value related to at least one client, the at least one client including one or more of at least one television, at least one STB, at least one satellite receiver, at least one legacy audiovisual player, at least one streaming media player, at least one external tuner, at least one game console, at least one cable box, at least one cable card, at least one smartphone, at least one Internet-connected device, or at least one computing device.

4. The method of claim 1, wherein the receiving one or more of at least some cue data, at least some pixel data, or at least one hash value related to at least one client comprises:
   receiving the one or more of at least some cue data, at least some pixel data, or at least one hash value related to at least one client, the received one or more of at least some cue data, at least some pixel data, or at least one hash value related to at least one content of at least one video display buffer of the at least one client.

5. The method of claim 1, wherein the receiving at least one indication of at least one targeted video segment on at least one monitored channel comprises:
   receiving the at least one indication of the at least one targeted video segment on the at least one monitored channel, wherein at least one audiovisual stream associated with the at least one monitored channel is received previous to the at least one audiovisual stream being received by at least one client receiving the at least one monitored channel.

6. The method of claim 1, wherein the receiving at least one indication of at least one targeted video segment on at least one monitored channel comprises:
   receiving at least some video data, the received at least some video data including at least one or more of at least one frame, at least one sample of a data stream, or at least one still image associated with the at least one monitored channel;
   determining one or more hash values associated with the received at least some video data;
   receiving at least one of one or more candidates or one or more suspects from a data store at least partially based on the determined one or more hash values, the data store including at least some hash values associated with one or more targeted video segments; and
   determining the at least one targeted video segment at least partially based on the received at least one of one or more candidates or one or more suspects.

7. The method of claim 1, wherein the determining one or more clients associated with the at least one monitored channel at least partially based on one or more stored relations of clients and channels comprises:
retrieving one or more client identifiers associated with matching (a) one or more stored relations of clients and channels with (b) one or more identifiers related to the at least one monitored channel.

8. The method of claim 1, wherein the determining one or more clients associated with the at least one monitored channel at least partially based on one or more stored relations of clients and channels comprises:
determining the one or more clients associated with the at least one monitored channel, the one or more clients tuned to the same channel as the at least one monitored channel, wherein at least one audiovisual stream associated with the at least one monitored channel is received previous to the at least one audiovisual stream being received by at least one client receiving at least one channel corresponding to the at least one monitored channel.

9. The method of claim 1, wherein the preparing one or more client triggers related to the at least one targeted video segment, the prepared one or more client triggers including at least (a) one or more time offsets related to latencies associated with the determined one or more clients and (b) one or more instructions associated with providing contextually-related content at one or more times related to the one or more time offsets, comprises:
preparing one or more triggers related to the at least one targeted video segment, the prepared one or more triggers capable of being received by the determined one or more clients, the prepared one or more triggers capable of causing at least some of the determined one or more clients to provide contextually-related content at one or more times related to the one or more time offsets.

10. The method of claim 1, wherein the preparing one or more client triggers related to the at least one targeted video segment, the prepared one or more client triggers including at least (a) one or more time offsets related to latencies associated with the determined one or more clients and (b) one or more instructions associated with providing contextually-related content at one or more times related to the one or more time offsets, comprises:
preparing one or more client triggers related to the at least one targeted video segment, the prepared one or more triggers including at least (a) at least some data related to at least one of a video sample, a frame, or a still image of the targeted video segment and (b) one or more instructions associated with providing contextually-related content at least one of simultaneously with or substantially simultaneously with rendering of the at least one of a video sample, a frame, or a still image of the targeted video segment by the at least one client device.

11. The method of claim 1, wherein the maintaining at least one store of relations of clients and channels comprises:
tracking clients, including at least maintaining a listing of clients which are active and the channels to which the clients are tuned; and
wherein receiving at least one indication of at least one targeted video segment on at least one monitored channel, determining one or more clients associated with the at least one monitored channel at least partially based on one or more stored relations of clients and channels, and preparing one or more client triggers related to the at least one targeted video segment, the prepared one or more triggers including at least (a) one or more time offsets related to latencies associated with the determined one or more clients and (b) one or more instructions associated with providing contextually-related content at one or more times related to the one or more time offsets comprise:
triggering clients, including at least using the listing of clients which are active and the channels to which the clients are tuned, wherein triggers are addressed to those clients listed as tuned to a particular channel showing a video segment of interest; and
wherein the tracking clients and the triggering clients are asynchronous operations.

12. The method of claim 1, wherein the receiving one or more of at least some cue data, at least some pixel data, or at least one hash value related to at least one client and the determining, at least partially based on the received one or more of at least some cue data, at least some pixel data, or at least one hash value, (is) at least one channel associated with the at least one client and (ii) at least one latency associated with at least one network feed and the determined at least one channel comprise:
receiving at least some audio data at least partially corresponding to at least one content of at least one video display buffer of the at least one client and determining, at least partially based on the received at least some audio data, (is) the at least one channel associated with the at least one client and (ii) the at least one latency associated with at least one network feed and the determined at least one channel.

13. The method of claim 1, wherein the receiving one or more of at least some cue data, at least some pixel data, or at least one hash value related to at least one client and the determining, at least partially based on the received one or more of at least some cue data, at least some pixel data, or at least one hash value, (is) at least one channel associated with the at least one client and (ii) at least one latency associated with at least one network feed and the determined at least one channel comprise:
receiving at least one channel identifier related to the at least one client and determining, at least partially based on the received at least one channel identifier, at least one latency associated with at least one network feed and associated with the received at least one channel identifier related to the at least one client.

14. The method of claim 1, wherein the determining, at least partially based on the received one or more of at least some cue data, at least some pixel data, or at least one hash value, (is) at least one channel associated with the at least one client and (ii) at least one latency associated with at least one network feed and the determined at least one channel comprises:
determining, at least partially based on the received one or more of at least some cue data, at least some pixel data, or at least one hash value, (is) the at least one channel associated with the at least one client and (ii) the at least one latency associated with at least one network feed and the determined at least one channel, the at least one network feed associated with at least one programming stream received from at least one of a network distribution point, a regional distribution point, or a local distribution point in a distribution network.

15. The method of claim 1, wherein the determining, at least partially based on the received one or more of at least some cue data, at least some pixel data, or at least one hash value, (is) at least one channel associated with the at least one client and (ii) at least one latency associated with at least one network feed and the determined at least one channel comprises:

determining, at least partially based on the received one or more of at least some cue data, at least some pixel data, or at least one hash value, (is) the at least one channel associated with the at least one client and (ii) the at least one latency associated with at least one network feed and the determined at least one channel, the at least one latency including at least one time offset associated with a quantum of time between receiving a particular sample of programming via the at least one network feed and receiving the particular sample of programming via the at least one client.

16. The method of claim 15, wherein a particular sample of programming comprises:

one or more of at least one video sample, at least one frame, at least one target frame, at least one still image, at least one audio sample, at least some audiovisual data, or at least some metadata related to programming associated with the at least one network feed.

17. The method of claim 1, wherein the receiving at least one indication of at least one targeted video segment on at least one monitored channel comprises:

receiving the at least one indication of the at least one targeted video segment on the at least one monitored channel, the at least one monitored channel associated with one or more of (is) at least one downlink of at least one network feed, (ii) at least one downlink of a network feed of the at least one monitored channel, (iii) at least one audiovisual stream received from at least one programmer at least one of wirelessly or by wire, or (iv) at least one audiovisual stream received from at least one of a network distribution point, a regional distribution point, or a local distribution point in a distribution network.

18. The method of claim 1, wherein the preparing one or more client triggers related to the at least one targeted video segment, the prepared one or more client triggers including at least (a) one or more time offsets related to latencies associated with the determined one or more clients and (b) one or more instructions associated with providing contextually-related content at one or more times related to the one or more time offsets, comprises:

preparing the one or more client triggers related to the at least one targeted video segment, the prepared one or more client triggers capable of causing one or more clients still tuned to the at least one monitored channel to provide contextually-related content.

19. The method of claim 1, wherein the preparing one or more client triggers related to the at least one targeted video segment, the prepared one or more client triggers including at least (a) one or more time offsets related to latencies associated with the determined one or more clients and (b) one or more instructions associated with providing contextually-related content at one or more times related to the one or more time offsets, comprises:

preparing the one or more client triggers related to the at least one targeted video segment, the prepared one or more client triggers capable of causing at least some of the determined one or more clients to provide contextually-related content at least one of simultaneously with or substantially simultaneously with the determined one or more clients rendering the at least one targeted video segment.

20. The method of claim 1, wherein the preparing one or more client triggers related to the at least one targeted video segment, the prepared one or more client triggers including at least (a) one or more time offsets related to latencies associated with the determined one or more clients and (b) one or more instructions associated with providing contextually-related content at one or more times related to the one or more time offsets, comprises:

preparing the one or more client triggers related to the at least one targeted video segment, the prepared one or more client triggers capable of causing at least some of the determined one or more clients to provide contextually-related content, the contextually-related content capable of being received by at least some of the determined one or more clients at least one of (is) previous to the receiving one or more of at least some cue data, at least some pixel data, or at least one hash value related to at least one client, (ii) previous to the preparing one or more client triggers related to the at least one targeted video segment, (iii) in response to the at least some of the determined one or more clients receiving the prepared one or more triggers, or (iv) substantially simultaneously with the at least some of the determined one or more clients rendering the at least one targeted video segment.

21. The method of claim 1, wherein at least one of the maintaining, receiving, determining, or preparing are at least one of implemented at least partially on a server computing device, implemented at least partially on a plurality of server computing devices, implemented at least partially in a server farm, implemented at least partially on a plurality of server computing devices at a plurality of sites, or implemented at least partially in one or more server computing clusters.

22. The method of claim 1, wherein the preparing one or more client triggers related to the at least one targeted video segment, the prepared one or more client triggers including at least (a) one or more time offsets related to latencies associated with the determined one or more clients and (b) one or more instructions associated with providing contextually-related content at one or more times related to the one or more time offsets, comprises:

preparing one or more client triggers related to the at least one targeted video segment, the prepared one or more client triggers capable of causing at least some of the determined one or more clients to generate one or more break structures.

23. The device of claim 22, wherein the preparing one or more client triggers related to the at least one targeted video segment, the prepared one or more client triggers capable of causing at least some of the determined one or more clients to generate one or more break structures, comprises:

preparing one or more client triggers related to the at least one targeted video segment, the prepared one or more client triggers capable of causing at least some of the determined one or more clients to customize one or more trigger sets, the customized one or more triggers sets comprising one or more break structures.

24. The device of claim 22, wherein the preparing one or more client triggers related to the at least one targeted video segment, the prepared one or more client triggers capable of causing at least some of the determined one or more clients to generate one or more break structures, comprises:

preparing one or more client triggers related to the at least one targeted video segment, the prepared one or more client triggers capable of causing at least some of the determined one or more clients to at least one of customize one or more trigger sets or generate one or more break structures, including at least associating one or more interactive events with one or more offset times related to starting times of particular content.

25. The method of claim 1, wherein the receiving at least one indication of at least one targeted video segment on at least one monitored channel comprises:
receiving at least one indication of at least one targeted video segment on at least one monitored channel, the at least one targeted video segment including one or more of at least one audiovisual data stream, at least one video data stream, at least one televise signal, at least one programming content, at least one program video stream, at least one video programming, at least some audio programming, at least one sequence of frames, at least one sequence of video frames, at least one television show, at least one commercial, or at least one broadcast.

26. A method, comprising:
sending, from at least one client, one or more of at least some cue data, at least some pixel data, or at least one hash value related to at least one content of at least one video display buffer, the sent one or more of at least some cue data, at least some pixel data, or at least one hash value at least partially indicative of at least one relation of the at least one client and at least one channel; and
receiving, by the at least one client, one or more triggers related to at least one targeted video segment, the one or more triggers including at least (a) one or more time offsets related to latencies associated with the at least one client and (b) one or more instructions associated with providing contextually-related content at one or more times related to the one or more time offsets, the received one or more triggers associated with at least:
at least one determination, at least partially based on the sent one or more of at least some cue data, at least some pixel data, or at least one hash value, of (is) at least one channel associated with the at least one content and the at least one client and (ii) at least one latency associated with at least one network feed and the indicated at least one channel; and
at least one indication of the at least one targeted video segment associated with at least one monitored channel.

27. The method of claim 26, wherein the sending, from at least one client, one or more of at least some cue data, at least some pixel data, or at least one hash value related to at least one content of at least one video display buffer, the sent one or more of at least some cue data, at least some pixel data, or at least one hash value at least partially indicative of at least one relation of the at least one client and at least one channel, comprises:
sending, from the at least one client, the at least one or more of at least some cue data, at least some pixel data, or at least one hash value related to the at least one content of the at least one video display buffer, the at least one client including one or more of at least one television, at least one smart television, at least one STB, at least one satellite receiver, at least one legacy audiovisual player, at least one streaming media player, at least one external tuner, at least one game console, at least one cable box, at least one cable card, at least one smartphone, at least one Internet-connected device, or at least one computing device.

28. The method of claim 26, further comprising:
determining at least one time at which to provide at least some contextually-related content at least partially based on at least one of the one or more received triggers; and
providing the at least some contextually-related content at the determined at least one time.

29. The method of claim 26, wherein the sending, from at least one client, one or more of at least some cue data, at least some pixel data, or at least one hash value related to at least one content of at least one video display buffer, the sent one or more of at least some cue data, at least some pixel data, or at least one hash value at least partially indicative of at least one relation of the at least one client and at least one channel, comprises:
sending, from the at least one client, one or more of at least some cue data, at least some pixel data, or at least one hash value related to at least one patch of pixels associated with the at least one content of the at least one video display buffer of the at least one client.

30. The method of claim 26, wherein the sending, from at least one client, one or more of at least some cue data, at least some pixel data, or at least one hash value related to at least one content of at least one video display buffer, the sent one or more of at least some cue data, at least some pixel data, or at least one hash value at least partially indicative of at least one relation of the at least one client and at least one channel, comprises:
sending, from the at least one client, at least some audio data at least partially corresponding to the at least one content of the at least one video display buffer, the sent at least some audio data at least partially indicative of at least one relation of the at least one client and at least one channel.

31. The method of claim 26, wherein the sending, from at least one client, one or more of at least some cue data, at least some pixel data, or at least one hash value related to at least one content of at least one video display buffer, the sent one or more of at least some cue data, at least some pixel data, or at least one hash value at least partially indicative of at least one relation of the at least one client and at least one channel, comprises:
sending, from the at least one client, at least one channel identifier encoded or hashed in the sent at least some cue data, at least some pixel data, or at least one hash value, the at least one channel identifier indicative of at least one relation of the at least one client and at least one channel.

32. The method of claim 26, further comprising:
generating a break structure related to the at least one content at least partially based on the received one or more triggers.

33. The method of claim 32, wherein the generating a break structure related to the at least one content at least partially based on the received one or more triggers comprises:
customizing a trigger set, the trigger set comprising a break structure.

34. The method of claim 32, wherein the generating a break structure related to the at least one content at least partially based on the received one or more triggers comprises:
at least one of generating a break structure or customizing a trigger set, including at least associating one or more interactive events or contextually-related content with one or more offset times related to one or more starting times of the at least one content.

35. The method of claim 26, further comprising:
displaying, at least partially based on at least one of the one or more received triggers, at least one overlay window on at least one display of the at least one client, the at least one overlay window including at least some contextually-related content.

36. The method of claim 26, further comprising:
determining whether the at least one client is still tuned to the at least one channel related to at least one of the one or more triggers and, if the at least one client is still tuned to the at least one channel related to at least one of the one or more triggers, providing at least some contextually-related content in association with the at least one of the one or more triggers.

37. The method of claim 26, wherein the receiving, by the at least one client, one or more triggers related to at least one targeted video segment, the one or more triggers including at least (a) one or more time offsets related to latencies associated with the at least one client and (b) one or more instructions associated with providing contextually-related content at one or more times related to the one or more time offsets, comprises:
receiving, by the at least one client, the one or more triggers related to the at least one target video segment, the one or more triggers capable of causing the at least one client to provide contextually-related content at one or more times related to the one or more time offsets.

38. The method of claim 26, wherein the receiving, by the at least one client, one or more triggers related to at least one targeted video segment, the one or more triggers including at least (a) one or more time offsets related to latencies associated with the at least one client and (b) one or more instructions associated with providing contextually-related content at one or more times related to the one or more time offsets, comprises:
receiving, by the at least one client, the one or more triggers related to the at least one target video segment, the one or more triggers including at least some data related to at least one of a video sample, a frame, or a still image of the targeted video segment.

39. The method of claim 38, further comprising:
detecting, by the at least one client, an actual start of the targeted video segment at least partially based on matching audiovisual stream data received by the at least one client with the at least some data related to at least one of a video sample, a frame, or a still image of the targeted video segment.

40. The method of claim 26, wherein the receiving, by the at least one client, one or more triggers related to at least one targeted video segment, the one or more triggers including at least (a) one or more time offsets related to latencies associated with the at least one client and (b) one or more instructions associated with providing contextually-related content at one or more times related to the one or more time offsets, comprises:
receiving, by the at least one client, the one or more triggers related to the at least one target video segment, the one or more triggers capable of causing the device to at least one of retrieve, format, provide, render, or display contextually-related content.

41. The method of claim 26, wherein the sending one or more of at least some cue data, at least some pixel data, or at least one hash value and the receiving one or more triggers are asynchronous operations.

42. The method of claim 26, wherein the receiving, by the at least one client, one or more triggers related to at least one targeted video segment, the one or more triggers including at least (a) one or more time offsets related to latencies associated with the at least one client and (b) one or more instructions associated with providing contextually-related content at one or more times related to the one or more time offsets, comprises:
receiving, by the at least one client, the one or more triggers related to the at least one targeted video segment, the one or more triggers capable of causing the at least one client to provide contextually-related content at least one of simultaneously with or substantially simultaneously with the start of the at least one targeted video segment.

43. The method of claim 26, wherein the receiving, by the at least one client, one or more triggers related to at least one targeted video segment, the one or more triggers including at least (a) one or more time offsets related to latencies associated with the at least one client and (b) one or more instructions associated with providing contextually-related content at one or more times related to the one or more time offsets, comprises:
receiving, by the at least one client, the one or more triggers related to the at least one targeted video segment, the one or more triggers capable of causing the at least one client to provide contextually-related content in association with the at least one targeted video segment, the provided contextually-related content received at least one of (i) previous to the sending one or more of at least some cue data, at least some pixel data, or at least one hash value related to at least one content of at least one video display buffer, (ii) previous to the receiving one or more triggers related to at least one targeted video segment, (iii) in response to receiving the one or more triggers, or (iv) substantially simultaneously with rendering the at least one targeted video segment.

44. A system, comprising:
a media data store for at least maintaining identifiers related to video segments;
an ingest module in communication with the media data store, the ingest module for at least receiving broadcasts and signaling the media data store to maintain the identifiers related to video segments associated with one or more received broadcasts, the ingest module implemented at least partially using one or more microprocessor-based computing devices;
a context data store, the context data store for at least maintaining identifiers related to one or more targeted video segments;
a video segment detection module in communication with the context data store and the ingest module, the video segment detection module for detecting one or more targeted video segments within one or more received broadcasts, the video detection module implemented at least partially using one or more microprocessor-based computing devices;
a client tracking module in communication with the media data store, the client tracking module for at least receiving client information and determining at least (is) at least one channel and (ii) at least one latency associated with at least one network feed and the determined at least one channel in response to received client information, the client tracking module implemented at least partially using one or more microprocessor-based computing devices; and
a client triggering module in communication with the client tracking module and the video segment detection module, the client triggering module for at least preparing one or more client triggers at least partially based on one or more indications received from the video segment detection module related to one or more targeted video segments and at least partially based on one or more indications received from the client tracking module related to one or more determined channels associated with at least one client and one or more time offsets related to at least one determined latency associated with the at least one client, the prepared one or more client triggers associated with providing contextually-related content at one or more times related to the one or more time offsets, the client triggering module implemented at least partially using one or more microprocessor-based computing devices.

45. The system of claim 44, wherein the ingest module, the video segment detection module, the client tracking module, and the client triggering module are at least one of implemented at least partially on a server computing device, implemented at least partially on a plurality of server computing devices, implemented at least partially in a server farm, or implemented at least partially in one or more server computing clusters.

46. The system of claim 44, wherein the ingest module, the video segment detection module, the client tracking module, and the client triggering module operate asynchronously relative to one another.

47. A machine, comprising:
  circuitry for maintaining at least one store of relations of clients and channels, including at least:
    circuitry for receiving one or more of at least some cue data, at least some pixel data, or at least one hash value related to at least one client;
    circuitry for determining, at least partially based on the received one or more of at least some cue data, at least some pixel data, or at least one hash value, (is) at least one channel associated with the at least one client and (ii) at least one latency associated with at least one network feed and the determined at least one channel; and
    circuitry for storing at least one relation including at least the determined at least one channel, the determined at least one latency, and at least one identifier related to the at least one client;
  circuitry for receiving at least one indication of at least one targeted video segment on at least one monitored channel;
  circuitry for determining one or more clients associated with the at least one monitored channel at least partially based on one or more stored relations of clients and channels; and
  circuitry for preparing one or more client triggers related to the at least one targeted video segment, the prepared one or more client triggers including at least (a) one or more time offsets related to latencies associated with the determined one or more clients and (b) one or more instructions associated with providing contextually-related content at one or more times related to the one or more time offsets.

48. The machine of claim 47, wherein the circuitry for receiving one or more of at least some cue data, at least some pixel data, or at least one hash value related to at least one client comprises:
  circuitry for receiving one or more of at least some cue data, at least some pixel data, or at least one hash value, the received one or more of at least some cue data, at least some pixel data, or at least one hash value related to at least one patch of pixels associated with at least one content of at least one video display buffer of the at least one client.

49. The machine of claim 47, wherein the circuitry for receiving one or more of at least some cue data, at least some pixel data, or at least one hash value related to at least one client comprises:
  circuitry for receiving the one or more of at least some cue data, at least some pixel data, or at least one hash value related to at least one client, the at least one client including one or more of at least one television, at least one STB, at least one satellite receiver, at least one legacy audiovisual player, at least one streaming media player, at least one external tuner, at least one game console, at least one cable box, at least one cable card, at least one smartphone, at least one Internet-connected device, or at least one computing device.

50. The machine of claim 47, wherein the circuitry for receiving one or more of at least some cue data, at least some pixel data, or at least one hash value related to at least one client comprises:
  circuitry for receiving the one or more of at least some cue data, at least some pixel data, or at least one hash value related to at least one client, the received one or more of at least some cue data, at least some pixel data, or at least one hash value related to at least one content of at least one video display buffer of the at least one client.

51. The machine of claim 47, wherein the circuitry for receiving at least one indication of at least one targeted video segment on at least one monitored channel comprises:
  circuitry for receiving the at least one indication of the at least one targeted video segment on the at least one monitored channel, wherein at least one audiovisual stream associated with the at least one monitored channel is received previous to the at least one audiovisual stream being received by at least one client receiving the at least one monitored channel.

52. The machine of claim 47, wherein the circuitry for receiving at least one indication of at least one targeted video segment on at least one monitored channel comprises:
  circuitry for receiving at least some video data, the received at least some video data including at least one or more of at least one frame, at least one sample of a data stream, or at least one still image associated with the at least one monitored channel;
  circuitry for determining one or more hash values associated with the received at least some video data;
  circuitry for receiving at least one of one or more candidates or one or more suspects from a data store at least partially based on the determined one or more hash values, the data store including at least some hash values associated with one or more targeted video segments; and
  circuitry for determining the at least one targeted video segment at least partially based on the received at least one of one or more candidates or one or more suspects.

53. The machine of claim 47, wherein the circuitry for determining one or more clients associated with the at least one monitored channel at least partially based on one or more stored relations of clients and channels comprises:
  circuitry for retrieving one or more client identifiers associated with matching (a) one or more stored relations of clients and channels with (b) one or more identifiers related to the at least one monitored channel.

54. The machine of claim 47, wherein the circuitry for determining one or more clients associated with the at least one monitored channel at least partially based on one or more stored relations of clients and channels comprises:
  circuitry for determining the one or more clients associated with the at least one monitored channel, the one or more clients tuned to the same channel as the at least one monitored channel, wherein at least one audiovisual stream associated with the at least one monitored channel is received previous to the at least one audiovisual stream being received by at least one client receiving at least one channel corresponding to the at least one monitored channel.

55. The machine of claim 47, wherein the circuitry for preparing one or more client triggers related to the at least one targeted video segment, the prepared one or more client triggers including at least (a) one or more time offsets related to latencies associated with the determined one or more clients and (b) one or more instructions associated with providing contextually-related content at one or more times related to the one or more time offsets, comprises:
  circuitry for preparing one or more triggers related to the at least one targeted video segment, the prepared one or more triggers capable of being received by the determined one or more clients, the prepared one or more triggers capable of causing at least some of the determined one or more clients to provide contextually-related content at one or more times related to the one or more time offsets.

56. The machine of claim 47, wherein the circuitry for preparing one or more client triggers related to the at least one targeted video segment, the prepared one or more client triggers including at least (a) one or more time offsets related to latencies associated with the determined one or more clients and (b) one or more instructions associated with providing contextually-related content at one or more times related to the one or more time offsets, comprises:
  circuitry for preparing one or more client triggers related to the at least one targeted video segment, the prepared one or more triggers including at least (a) at least some data related to at least one of a video sample, a frame, or a still image of the targeted video segment and (b) one or more instructions associated with providing contextually-related content at least one of simultaneously with or substantially simultaneously with rendering of the at least one of a video sample, a frame, or a still image of the targeted video segment by the at least one client device.

57. The machine of claim 47, wherein the circuitry for maintaining at least one store of relations of clients and channels comprises:
  circuitry for tracking clients, including at least circuitry for maintaining a listing of clients which are active and the channels to which the clients are tuned; and
  wherein the circuitry for receiving at least one indication of at least one targeted video segment on at least one monitored channel, the circuitry for determining one or more clients associated with the at least one monitored channel at least partially based on one or more stored relations of clients and channels, and the circuitry for preparing one or more client triggers related to the at least one targeted video segment, the prepared one or more triggers including at least (a) one or more time offsets related to latencies associated with the determined one or more clients and (b) one or more instructions associated with providing contextually-related content at one or more times related to the one or more time offsets comprise:
    circuitry for triggering clients, including at least circuitry for using the listing of clients which are active and the channels to which the clients are tuned, wherein triggers are addressed to those clients listed as tuned to a particular channel showing a video segment of interest; and
  wherein the circuitry for tracking clients and the circuitry for triggering clients operate asynchronously with respect to one another.

58. The machine of claim 47, wherein the circuitry for receiving one or more of at least some cue data, at least some pixel data, or at least one hash value related to at least one client and the determining, at least partially based on the received one or more of at least some cue data, at least some pixel data, or at least one hash value, (is) at least one channel associated with the at least one client and (ii) at least one latency associated with at least one network feed and the determined at least one channel comprise:
  circuitry for receiving at least some audio data at least partially corresponding to at least one content of at least one video display buffer of the at least one client and determining, at least partially based on the received at least some audio data, (is) the at least one channel associated with the at least one client and (ii) the at least one latency associated with at least one network feed and the determined at least one channel.

59. The machine of claim 47, wherein the circuitry for receiving one or more of at least some cue data, at least some pixel data, or at least one hash value related to at least one client and the determining, at least partially based on the received one or more of at least some cue data, at least some pixel data, or at least one hash value, (is) at least one channel associated with the at least one client and (ii) at least one latency associated with at least one network feed and the determined at least one channel comprise:
  circuitry for receiving at least one channel identifier related to the at least one client and determining, at least partially based on the received at least one channel identifier, at least one latency associated with at least one network feed and associated with the received at least one channel identifier related to the at least one client.

60. The machine of claim 47, wherein the circuitry for determining, at least partially based on the received one or more of at least some cue data, at least some pixel data, or at least one hash value, (is) at least one channel associated with the at least one client and (ii) at least one latency associated with at least one network feed and the determined at least one channel comprises:
  circuitry for determining, at least partially based on the received one or more of at least some cue data, at least some pixel data, or at least one hash value, (is) the at least one channel associated with the at least one client and (ii) the at least one latency associated with at least one network feed and the determined at least one channel, the at least one network feed associated with at least one programming stream received from at least one of a network distribution point, a regional distribution point, or a local distribution point in a distribution network.

61. The machine of claim 47, wherein the circuitry for determining, at least partially based on the received one or more of at least some cue data, at least some pixel data, or at least one hash value, (is) at least one channel associated with the at least one client and (ii) at least one latency associated with at least one network feed and the determined at least one channel comprises:
  circuitry for determining, at least partially based on the received one or more of at least some cue data, at least some pixel data, or at least one hash value, (is) the at least one channel associated with the at least one client and (ii) the at least one latency associated with at least one network feed and the determined at least one channel, the at least one latency including at least one time offset associated with a quantum of time between receiving a particular sample of programming via the at least one network feed and receiving the particular sample of programming via the at least one client.

62. The machine of claim 61, wherein a particular sample of programming comprises:
one or more of at least one video sample, at least one frame, at least one target frame, at least one still image, at least one audio sample, at least some audiovisual data, or at least some metadata related to programming associated with the at least one network feed.

63. The machine of claim 47, wherein the circuitry for receiving at least one indication of at least one targeted video segment on at least one monitored channel comprises:
circuitry for receiving the at least one indication of the at least one targeted video segment on the at least one monitored channel, the at least one monitored channel associated with one or more of (is) at least one downlink of at least one network feed, (ii) at least one downlink of a network feed of the at least one monitored channel, (iii) at least one audiovisual stream received from at least one programmer at least one of wirelessly or by wire, or (iv) at least one audiovisual stream received from at least one of a network distribution point, a regional distribution point, or a local distribution point in a distribution network.

64. The machine of claim 47, wherein the circuitry for preparing one or more client triggers related to the at least one targeted video segment, the prepared one or more client triggers including at least (a) one or more time offsets related to latencies associated with the determined one or more clients and (b) one or more instructions associated with providing contextually-related content at one or more times related to the one or more time offsets comprises:
circuitry for preparing the one or more client triggers related to the at least one targeted video segment, the prepared one or more client triggers capable of causing one or more clients still tuned to the at least one monitored channel to provide contextually-related content.

65. The machine of claim 47, wherein the circuitry for preparing one or more client triggers related to the at least one targeted video segment, the prepared one or more client triggers including at least (a) one or more time offsets related to latencies associated with the determined one or more clients and (b) one or more instructions associated with providing contextually-related content at one or more times related to the one or more time offsets comprises:
circuitry for preparing the one or more client triggers related to the at least one targeted video segment, the prepared one or more client triggers capable of causing at least some of the determined one or more clients to provide contextually-related content at least one of simultaneously with or substantially simultaneously with the determined one or more clients rendering the at least one targeted video segment.

66. The machine of claim 47, wherein the circuitry for preparing one or more client triggers related to the at least one targeted video segment, the prepared one or more client triggers including at least (a) one or more time offsets related to latencies associated with the determined one or more clients and (b) one or more instructions associated with providing contextually-related content at one or more times related to the one or more time offsets comprises:
circuitry for preparing the one or more client triggers related to the at least one targeted video segment, the prepared one or more client triggers capable of causing at least some of the determined one or more clients to provide contextually-related content, the contextually-related content capable of being received by at least some of the determined one or more clients at least one of (is) previous to the receiving one or more of at least some cue data, at least some pixel data, or at least one hash value related to at least one client, (ii) previous to the preparing one or more client triggers related to the at least one targeted video segment, (iii) in response to the at least some of the determined one or more clients receiving the prepared one or more triggers, or (iv) substantially simultaneously with the at least some of the determined one or more clients rendering the at least one targeted video segment.

67. The machine of claim 47, wherein the circuitry for preparing one or more client triggers related to the at least one targeted video segment, the prepared one or more client triggers including at least (a) one or more time offsets related to latencies associated with the determined one or more clients and (b) one or more instructions associated with providing contextually-related content at one or more times related to the one or more time offsets comprises:
circuitry for preparing one or more client triggers related to the at least one targeted video segment, the prepared one or more client triggers capable of causing at least some of the determined one or more clients to generate one or more break structures.

68. The device of claim 67, wherein the circuitry for preparing one or more client triggers related to the at least one targeted video segment, the prepared one or more client triggers capable of causing at least some of the determined one or more clients to generate one or more break structures, comprises:
circuitry for preparing one or more client triggers related to the at least one targeted video segment, the prepared one or more client triggers capable of causing at least some of the determined one or more clients to customize one or more trigger sets, the customized one or more triggers sets comprising one or more break structures.

69. The device of claim 67, wherein the circuitry for preparing one or more client triggers related to the at least one targeted video segment, the prepared one or more client triggers capable of causing at least some of the determined one or more clients to generate one or more break structures, comprises:
circuitry for preparing one or more client triggers related to the at least one targeted video segment, the prepared one or more client triggers capable of causing at least some of the determined one or more clients to at least one of customize one or more trigger sets or generate one or more break structures, including at least associating one or more interactive events with one or more offset times related to starting times of particular content.

70. The machine of claim 47, wherein the circuitry for receiving at least one indication of at least one targeted video segment on at least one monitored channel comprises:
circuitry for receiving at least one indication of at least one targeted video segment on at least one monitored channel, the at least one targeted video segment including one or more of at least one audiovisual data stream, at least one video data stream, at least one televise signal, at least one programming content, at least one program video stream, at least one video programming, at least some audio programming, at least one sequence of frames, at least one sequence of video frames, at least one television show, at least one commercial, or at least one broadcast.

71. The machine of claim 47, wherein at least one of the circuitry for maintaining, circuitry for receiving, circuitry for determining, or circuitry for preparing are at least one of implemented at least partially on a server computing device, implemented at least partially on a plurality of server computing devices, implemented at least partially in a server farm, implemented at least partially on a plurality of server computing devices at a plurality of sites, or implemented at least partially in one or more server computing clusters.

72. A client device, comprising:
   at least one processing device; and
   at least one memory bearing one or more instructions that, when executed by the at least one processing device, cause the at least one processing device to at least:
      send one or more of at least some cue data, at least some pixel data, or at least one hash value related to at least one content of at least one video display buffer associated with the device, the sent one or more of at least some cue data, at least some pixel data, or at least one hash value at least partially indicative of at least one relation of the device and at least one channel; and
      receive one or more triggers related to at least one targeted video segment, the one or more triggers including at least (a) one or more time offsets related to latencies associated with the device and (b) one or more instructions associated with providing contextually-related content at one or more times related to the one or more time offsets, the received one or more triggers associated with at least:
         at least one determination, at least partially based on the sent one or more of at least some cue data, at least some pixel data, or at least one hash value, of (is) at least one channel associated with the at least one content and the device and (ii) at least one latency associated with at least one network feed and the indicated at least one channel; and
         at least one indication of the at least one targeted video segment associated with at least one monitored channel.

73. The client device of claim 72, wherein the client device includes at least one of a television, a smart television, a STB, a satellite receiver, a legacy audiovisual player, a streaming media player, an external tuner, a game console, a cable box, a cable card, a smartphone, an Internet-connected device, or a computing device.

74. A client device, comprising:
   circuitry for sending one or more of at least some cue data, at least some pixel data, or at least one hash value related to at least one content of at least one video display buffer associated with the device, the sent one or more of at least some cue data, at least some pixel data, or at least one hash value at least partially indicative of at least one relation of the device and at least one channel; and
   circuitry for receiving one or more triggers related to at least one targeted video segment, the one or more triggers including at least (a) one or more time offsets related to latencies associated with the device and (b) one or more instructions associated with providing contextually-related content at one or more times related to the one or more time offsets, the received one or more triggers associated with at least:
      at least one determination, at least partially based on the sent one or more of at least some cue data, at least some pixel data, or at least one hash value, of (is) at least one channel associated with the at least one content and the device and (ii) at least one latency associated with at least one network feed and the indicated at least one channel; and
      at least one indication of the at least one targeted video segment associated with at least one monitored channel.

75. The client device of claim 74, wherein the circuitry for sending one or more of at least some cue data, at least some pixel data, or at least one hash value related to at least one content of at least one video display buffer associated with the device, the sent one or more of at least some cue data, at least some pixel data, or at least one hash value at least partially indicative of at least one relation of the device and at least one channel, comprises:
   circuitry for sending from the at least one client device the one or more of at least some cue data, at least some pixel data, or at least one hash value related to the at least one content of the at least one video display buffer, the at least one client device including one or more of at least one television, at least one smart television, at least one STB, at least one satellite receiver, at least one legacy audiovisual player, at least one streaming media player, at least one external tuner, at least one game console, at least one cable box, at least one cable card, at least one smartphone, at least one Internet-connected device, or at least one computing device.

76. The client device of claim 74, further comprising:
   circuitry for determining at least one time at which to provide at least some contextually-related content at least partially based on at least one of the one or more received triggers; and
   circuitry for providing the at least some contextually-related content at the determined at least one time.

77. The client device of claim 74, wherein the circuitry for sending one or more of at least some cue data, at least some pixel data, or at least one hash value related to at least one content of at least one video display buffer associated with the device, the sent one or more of at least some cue data, at least some pixel data, or at least one hash value at least partially indicative of at least one relation of the device and at least one channel, comprises:
   circuitry for sending one or more of at least some cue data, at least some pixel data, or at least one hash value related to at least one patch of pixels associated with the at least one content of the at least one video display buffer of the at least one client device.

78. The client device of claim 74, wherein the circuitry for sending one or more of at least some cue data, at least some pixel data, or at least one hash value related to at least one content of at least one video display buffer associated with the device, the sent one or more of at least some cue data, at least some pixel data, or at least one hash value at least partially indicative of at least one relation of the device and at least one channel, comprises:
   circuitry for sending at least some audio data at least partially corresponding to the at least one content of the at least one video display buffer, the sent at least some audio data at least partially indicative of at least one relation of the at least one client device and at least one channel.

79. The client device of claim 74, wherein the circuitry for sending one or more of at least some cue data, at least some pixel data, or at least one hash value related to at least one content of at least one video display buffer associated with the device, the sent one or more of at least some cue data, at least some pixel data, or at least one hash value at least partially indicative of at least one relation of the device and at least one channel, comprises:
   circuitry for sending at least one channel identifier encoded or hashed in the sent at least some cue data, at least some pixel data, or at least one hash value, the at least one channel identifier indicative of at least one relation of the at least one client device and at least one channel.

80. The client device of claim 74, further comprising:
circuitry for generating a break structure related to the at least one content at least partially based on the received one or more triggers.

81. The client device of claim 80, wherein the circuitry for generating a break structure related to the at least one content at least partially based on the received one or more triggers comprises:
circuitry for customizing a trigger set, the trigger set comprising a break structure.

82. The client device of claim 80, wherein the circuitry for generating a break structure related to the at least one content at least partially based on the received one or more triggers comprises:
circuitry for at least one of generating a break structure or customizing a trigger set, including at least circuitry for associating one or more interactive events or contextually-related content with one or more offset times related to one or more starting times of the at least one content.

83. The client device of claim 74, further comprising:
circuitry for displaying, at least partially based on at least one of the one or more received triggers, at least one overlay window on at least one display of the at least one client, the at least one overlay window including at least some contextually-related content.

84. The client device of claim 74, further comprising:
circuitry for determining whether the at least one client device is still tuned to the at least one channel related to at least one of the one or more triggers and, if the at least one client device is still tuned to the at least one channel related to at least one of the one or more triggers, providing at least some contextually-related content in association with the at least one of the one or more triggers.

85. The client device of claim 74, wherein the circuitry for receiving one or more triggers related to at least one targeted video segment, the one or more triggers including at least (a) one or more time offsets related to latencies associated with the device and (b) one or more instructions associated with providing contextually-related content at one or more times related to the one or more time offsets, comprises:
circuitry for receiving the one or more triggers related to the at least one target video segment, the one or more triggers capable of causing the client device to provide contextually-related content at one or more times related to the one or more time offsets.

86. The client device of claim 74, wherein the circuitry for receiving one or more triggers related to at least one targeted video segment, the one or more triggers including at least (a) one or more time offsets related to latencies associated with the device and (b) one or more instructions associated with providing contextually-related content at one or more times related to the one or more time offsets, comprises:
circuitry for receiving the one or more triggers related to the at least one target video segment, the one or more triggers including at least some data related to at least one of a video sample, a frame, or a still image of the targeted video segment.

87. The client device of claim 86, further comprising:
circuitry for detecting an actual start of the targeted video segment at least partially based on matching audiovisual stream data received by the client device with the at least some data related to at least one of a video sample, a frame, or a still image of the targeted video segment.

88. The client device of claim 74, wherein the circuitry for receiving one or more triggers related to at least one targeted video segment, the one or more triggers including at least (a) one or more time offsets related to latencies associated with the device and (b) one or more instructions associated with providing contextually-related content at one or more times related to the one or more time offsets, comprises:
circuitry for receiving the one or more triggers related to the at least one target video segment, the one or more triggers capable of causing the client device to at least one of retrieve, format, provide, render, or display contextually-related content.

89. The client device of claim 74, wherein the circuitry for sending one or more of at least some cue data, at least some pixel data, or at least one hash value and the circuitry for receiving one or more triggers operate asynchronously with respect to one another.

90. The client device of claim 74, wherein the circuitry for receiving one or more triggers related to at least one targeted video segment, the one or more triggers including at least (a) one or more time offsets related to latencies associated with the device and (b) one or more instructions associated with providing contextually-related content at one or more times related to the one or more time offsets, comprises:
circuitry for receiving the one or more triggers related to the at least one targeted video segment, the one or more triggers capable of causing the client device to provide contextually-related content at least one of simultaneously with or substantially simultaneously with the start of the at least one targeted video segment.

91. The client device of claim 74, wherein the circuitry for receiving one or more triggers related to at least one targeted video segment, the one or more triggers including at least (a) one or more time offsets related to latencies associated with the device and (b) one or more instructions associated with providing contextually-related content at one or more times related to the one or more time offsets, comprises:
circuitry for receiving the one or more triggers related to the at least one targeted video segment, the one or more triggers capable of causing the client device to provide contextually-related content in association with the at least one targeted video segment, the provided contextually-related content received at least one of (is) previous to the sending one or more of at least some cue data, at least some pixel data, or at least one hash value related to at least one content of at least one video display buffer, (ii) previous to the receiving one or more triggers related to at least one targeted video segment, (iii) in response to receiving the one or more triggers, or (iv) substantially simultaneously with rendering the at least one targeted video segment.

* * * * *